United States Patent
Matsumoto

(10) Patent No.: US 6,791,633 B2
(45) Date of Patent: Sep. 14, 2004

(54) LIQUID CRYSTAL DISPLAY AND MANUFACTURING METHOD OF SAME

(75) Inventor: Kimikazu Matsumoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 96 days.

(21) Appl. No.: 10/102,979

(22) Filed: Mar. 22, 2002

(65) Prior Publication Data

US 2002/0176030 A1 Nov. 28, 2002

(30) Foreign Application Priority Data

Mar. 23, 2001 (JP) ........................................ 2001-085545

(51) Int. Cl.[7] .............................................. G02F 1/133
(52) U.S. Cl. ......................................................... 349/42
(58) Field of Search .............................. 349/42; 345/89, 345/96

(56) References Cited

U.S. PATENT DOCUMENTS 5,164,851 A * 11/1992 Kanemori et al. ............. 349/55
5,818,407 A * 10/1998 Hori et al. ..................... 345/92

FOREIGN PATENT DOCUMENTS

| JP | 2000-235371 | | 8/2000 | |
| JP | 2002235371 | * | 8/2000 | ........... G02F/1/133 |

* cited by examiner

Primary Examiner—Robert H. Kim
Assistant Examiner—Prasad R. Akkapeddi
(74) Attorney, Agent, or Firm—Foley and Lardner LLP

(57) ABSTRACT

A liquid crystal display and a method for manufacturing the liquid crystal display which are capable of an inhibiting occurrence of strong flicker even when only pixels each having a same polarity are displayed on a screen, without causing a decrease in an aperture rate. In the above liquid crystal display, first and second data lines each feeding a pixel voltage being different in polarity to each of first and second pixel electrodes through first and second thin film transistors are formed in such a manner that the first data line is overlaid by the second data line with an insulating film being interposed between the first and second data lines.

15 Claims, 30 Drawing Sheets

US 6,791,633 B2

LIQUID CRYSTAL DISPLAY AND MANUFACTURING METHOD OF SAME

BACKGROUND OF THE INVENTION

1. Field of the Invention

The present invention relates to a liquid crystal display (LCD) and a method for manufacturing the LCD and more particularly to the LCD made up of unit pixels each having two driving elements driven by a same scanning line and two pixel electrodes to one of which a pixel voltage fed from one of two data lines is applied through one of the driving elements and to the other of which a pixel voltage fed from the other of the two data lines being opposite in polarity to the pixel voltage fed from the former of the two data lines is applied through the other of the driving elements and the method for manufacturing the above LCD.

The present application claims priority of Japanese Patent Application No.2001-085545 filed on Mar. 23, 2001, which is hereby incorporated by reference.

2. Description of the Related Art

An LCD is widely used as a display for various information devices. The LCD is basically so configured that a liquid crystal is put in a hermetically sealed manner between a TFT (Thin Film Transistor) substrate (driving element substrate) on which a TFT is formed serving as a switching element (driving element) used to do ON/OFF switching for selection of each of unit pixels to provide a display on a screen and a facing substrate and that a plurality of unit pixels is arranged in a matrix form. Such the LCD is roughly classified, according to a difference in its display method, into a TN (Twisted Nematic)-type LCD and an IPS (In-Plane Switching)-type LCD.

In the TN-type LCD, a pixel voltage is applied to a pixel electrode formed on a TFT substrate and a common voltage is applied to a common electrode formed on a facing substrate and, by a difference between the pixel voltage and the common voltage, a longitudinal electric field is generated in a direction orthogonal to surfaces of both the TFT substrate and the facing substrate to drive a liquid crystal.

On the other hand, in the IPS-type LCD, both a pixel electrode and a common electrode are formed on a TFT substrate being one of two substrates in such a manner that both the pixel electrode and the common electrode are insulated from each other by an interlayer insulating film and, by a difference in voltages between the pixel electrode and the common electrode, a transverse electric field is generated in a direction horizontal to surfaces of both the pixel electrode and the common electrodes to drive a liquid crystal.

When the LCD is driven by the method described above, the IPS-type LCD in particular, has an advantage in that, since a longitudinal axis of its liquid crystal molecule is arranged in a horizontal direction along the surfaces of both the TFT substrate and facing substrate, a change in brightness is made small even by a change of viewing direction when the LCD is observed and it can provide a wide viewing angle. Therefore, in recent years, there is a tendency that the IPS-type LCD is preferably used.

FIG. 35 is a plan view showing configurations of a conventional IPS-type LCD. FIG. 36 is a cross-sectional view of FIG. 35 taken along a line L—L. In FIGS. 35 and 36, configurations of one unit pixel 100 only are shown. As shown in FIGS. 35 and 36, a liquid crystal 103 is put in a hermetically sealed manner between a TFT substrate 101 and a facing substrate 102. The TFT substrate 101 includes a first transparent substrate 106 made of glass or a like, a first polarizer 107 formed on a rear of the first transparent substrate 106, a scanning line (gate bus line) 108 formed on apart of a surface of the first transparent substrate 106, common electrodes 109 formed on an other part of the surface of the first transparent substrate 106, an interlayer insulating film 110 serving as a gate insulating film formed in a manner so as to cover the scanning line 108 and the common electrodes 109, a semiconductor layer 113 formed on the scanning line 108 with the interlayer insulating film 110 being interposed between the semiconductor layer 113 and the scanning line 108, a drain electrode 116 and a source electrode 117 each being connected to the semiconductor layer 113, pixel electrodes 121 and data lines 122 formed on the interlayer insulating film 110 being integrated into the drain electrode 116 and the source electrode 117, a passivation film 125 formed in a manner so as to cover the pixel electrodes 121 and the data lines 122, and a first oriented film 127 formed in a manner so as to cover the pixel electrodes 121 and the data lines 122 with the passivation film 125 being interposed between the first oriented film 127 and the pixel electrodes 121 and the data lines 122. Here, the scanning line 108, semiconductor layer 113, drain electrode 116 and source electrode 117 make up a TFT 129.

On the other hand, the facing substrate 102 includes a second transparent substrate 131 made of glass or a like, a second polarizer 133 formed on a rear of the second transparent substrate 131 with a conductive layer 132, for prevention against static electricity, being interposed between the second transparent substrate 131 and the second polarizer 133, a black matrix layer 134 formed on a surface of the second transparent substrate 131, a colored layer 135 serving as a color filter formed in a manner so as to cover the black matrix layer 134, a planarized film 136 formed in a manner so as to cover the black matrix layer 134 and the colored layer 135, and a second oriented film 137 formed on the planarized film 136. The arrow line 139 shows an oriented direction of the liquid crystal 103.

In order to drive the conventional LCD as described, a voltage having a different polarity by every period is cyclically applied to pixel electrodes 121 making up a unit pixel 100, with an aim to increase a life of a liquid crystal 103. That is, a pixel voltage Ve having a different polarity by every period as shown in FIG. 37 is fed to the pixel electrodes 121 through the TFT 129 from the data lines 122. In FIG. 37, a common voltage Vc is applied to the common electrodes 109 and the liquid crystal 103 is driven by voltage differences Vd1 and Vd2 between the pixel voltage Ve and the common voltage Vc with timing when a scanning voltage (not shown) is fed and the liquid crystal 103 holds an electric charge corresponding to each of the voltages for driving the described above.

To drive the liquid crystal 103 by cyclically feeding the pixel voltages Ve each having a different polarity by each period to the pixel electrodes 121, three methods described below are mainly employed. A first method is called a "one-horizontal-reverse driving method" in which, to switch image data making up an image in a display, a polarity of the unit pixel 100 is reversed from a positive side to a negative side and vice versa for every one horizontal line of unit pixels 100, as shown in FIG. 38A. A second method is called an "one-vertical-reverse driving method" in which, to switch the image data, the polarity of the unit pixel 100 is reversed from a positive side to a negative side and vice versa for every one vertical line of unit pixels 100 as shown in FIG. 38B. A third method is called a "dot-reverse driving method"

in which, to switch the image data, a polarity of the unit pixel 100 is reversed from a positive side to a negative side and vice versa for every dot in such a manner that unit pixels 100 are displayed checkerwise as shown in FIG. 38C.

FIG. 39 is a diagram showing a driving circuit employed in the conventional LCD and FIG. 40 is an expanded diagram showing a terminal section A shown in FIG. 39 and a terminal section B shown in FIG. 39. As shown in FIG. 39, a scanning line driving circuit 151 is connected to a scanning line 108 making up the unit pixels 100 being arranged in a matrix form and a scanning line signal is fed to each of the unit pixels 100 through the scanning line 108, while a data line driving circuit 152 is connected to data lines 122 and a data line signal is fed to the unit pixel 100 through the data lines 122. Moreover, a common electrode wiring driving circuit 153 is connected to a common electrode wiring 120 and a common voltage Vc is fed to the unit pixel 100 through the common electrode wiring 120.

As is apparent from FIG. 40, in the terminal section A, each of data line terminal sections 122A adapted to supply a potential to the data lines 122 is coated with an ITO (Indium Tin Oxide) film 122a. Moreover, in the terminal section B, a scanning line terminal section 108A adapted to supply a potential to the scanning line 108 is coated with an ITO film 108a and a common electrode wiring terminal section 120A adapted to supply a potential to the common electrode wiring 120 is coated with an ITO film 120a.

However, the conventional LCD has a disadvantage in that, when a display by only the unit pixels 100 each having a same polarity on a screen is required, strong flicker occurs which causes an unclear display screen. For example, when pixels each having a positive polarity only as shown in FIG. 41A, or each having a negative polarity only as shown in FIG. 41B are displayed checkerwise, strong flicker occurs. This is because the conventional LCD is so configured that, by displaying a plurality of unit pixels 100 each being supplied with pixel voltages Ve each having a different polarity, occurrence of flickers is apparently reduced. More particularly, this is because an ON-characteristic of the TFT 129 being connected between the data lines 122 and the pixel electrodes 121 and a data voltage holding characteristic of the liquid crystal 103 are different depending on whether a polarity of a supplied voltage is positive or negative. That is, in FIG. 37, no problem occurs if the voltage differences Vd1 and Vd2 are equal to each other, however, since the common voltage Vc changes, the voltage difference Vd1 becomes different from the voltage difference Vd2 and, therefore, when the unit pixels 100 are displayed checkerwise, the occurrence of the strong flicker is inevitable.

A conventional LCD in which an attempt has been made to inhibit occurrence of strong flicker even when only the unit pixels 100 each having a same polarity are displayed is disclosed in, for example, Japanese Patent Application Laid-open No. 2000-235371. FIG. 42A is a diagram showing configurations of a circuit employed in the above conventional LCD. FIG. 42B is a layout diagram of the conventional LCD of FIG. 42A. The disclosed conventional LCD, as shown in FIGS. 42A and 42B, includes a scanning line 201c, a main data line 202c, a sub-data line 202d, a common wiring 209, a main TFT 203c being connected to a point of intersection between the scanning line 201c and the main data line 202c, a sub-TFT 203d being connected to a point of intersection between the scanning line 201c and the sub-data line 202d, facing electrodes 211, a main pixel electrode 204c, a liquid crystal 210c being put in a hermetically sealed manner between one of the facing electrode 211 and the main pixel electrode 204c, a liquid crystal 210d put in a hermetically sealed manner between another of the facing electrode 211 and a sub-pixel electrode 204d, a storing capacitor 208c formed between the common wiring 209 and the main pixel electrode 204c, and a storing capacitor 208d formed between the common wiring 209 and the sub-pixel electrode 204d.

In the conventional LCD having configurations described above, for example, as shown in FIG. 38A, when image data making up images of pixels existing on one horizontal line is switched, by reversing a polarity of a pixel voltage to be fed to the main electrodes 204c to a positive side or a negative side and vice versa for every unit pixel 100 and to the sub-electrode 204d to a negative side or a positive side and vice versa, a pixel having a positive polarity and a pixel having a negative polarity both having a same luminance can be always disposed adjacent to each other for every unit pixel 100 and, therefore, even when only pixels each having a same polarity are displayed, it is possible to inhibit the occurrence of strong flicker.

However, in the disclosed conventional LCD, though, even when only pixels each having a same polarity are displayed, the occurrence of a strong flicker can be inhibited, there is a problem in that, since the main data line and sub-data line used to apply a pixel voltage having a positive or negative polarity and a pixel voltage having a negative or positive polarity to the main pixel electrode and sub-pixel electrode respectively in the unit pixel 100 are formed on a same plane and a decrease in an aperture rate of the unit pixel 100 occurs. That is, in the conventional LCD disclosed in the Japanese Patent Application Laid-open No. 2000-235371, as shown in FIGS. 42A and 42B, since the two kinds of the data lines, one being the main data line 202c used to feed a pixel voltage to the main pixel electrode 204c through the main TFT 203c and another being the sub-data line 202d used to feed a pixel voltage to the sub-pixel electrode 204d through the sub-TFT 203d, are formed on a same plane, an area occupied by the data lines in the unit pixel 100 is doubled, which causes a decrease in an area through which light transmits and therefore a decrease in the aperture rate.

In the case of the IPS-type LCD in particular, as shown in FIGS. 35 and 36, since the common electrodes 109 and the pixel electrodes 121 both being made from light-shielding metal are mounted on a same plane, its aperture rate is originally low. Therefore, if such configurations shown in FIGS. 42A and B are employed in the IPS-type LCD, the aperture rate becomes worse, which makes it difficult to achieve a bright display by an LCD.

SUMMARY OF THE INVENTION

In view of the above, it is an object of the present invention to provide an LCD and a method for manufacturing the LCD which are capable of inhibiting occurrence of a strong flicker even when only pixels each having a same polarity are displayed on a screen, without causing a decrease in an aperture rate.

According to a first aspect of the present invention, there is provided an LCD including:

A plurality of unit pixels each having a liquid crystal being put in a hermetically sealed manner between a driving element substrate on which driving elements are formed and a facing substrate wherein the driving elements are made up of first and second driving elements driven by a same scanning line, and having first and second pixel electrodes to one of which a pixel voltage is fed from one of the first and second data lines through one of the first and second driving elements and to the other of which a pixel voltage being opposite in polarity to the pixel voltage fed from the one of the first and second data line is fed from the other of the first and second data lines through the other of the first and second driving elements;

wherein the first and second data lines are formed in a manner that the second data line is disposed above the first data line and in a manner that the first data line is overlaid by the second data line with an insulating film being interposed between the first and second data lines on the driving element substrate.

In the foregoing, a preferable mode is one wherein the insulating film is constructed of an organic insulating film or an inorganic insulating film or a stacked layer made up of both the organic insulating film and the inorganic insulating film.

Also, a preferable mode is one wherein the first and second pixel electrodes and common electrodes are formed on the driving element substrate in a manner that the first and second pixel electrodes and the common electrodes are insulated from each other by an interlayer insulating film.

Also, a preferable mode is one wherein the first and second pixel electrodes and the first data line are formed on a same insulating film.

Also, a preferable mode is one wherein the first and second pixel electrodes and the second data line are covered by an oriented film.

Also, a preferable mode is one wherein the first and second data lines both applying a pixel voltage having a same polarity are overlaid by each other.

Also, a preferable mode is one wherein the first and second data lines feed the pixel voltage to the first and second pixel electrodes in unit pixels being different from each other.

Also, a preferable mode is one wherein a colored layer is formed on the driving element substrate.

Also, a preferable mode is one wherein the common electrodes are in contact with the liquid crystal through the oriented film.

Also, a preferable mode is one wherein the second data line is formed in a manner that the second data line is disposed above the first data line and that the first data line is overlaid by the second data line with the interlayer insulating film being interposed between the second and first data lines.

Also, a preferable mode is one wherein the first and second pixel electrodes and the common electrodes are formed on the same interlayer insulating film covering the second data line.

Also, a preferable mode is one wherein the common electrodes are formed on the facing substrate.

Furthermore, a preferable mode is one wherein the unit pixel is driven by an one-horizontal-reverse driving method, an one-vertical-reverse driving method, or a dot-reverse driving method.

According to a second aspect of the present invention, there is provided a method for manufacturing an LCD including unit pixels each having first and second driving elements driven by a same scanning line and having first and second pixel electrodes to each of which a pixel voltage having a different polarity is applied from each of first and second data lines through each of the first and second driving elements, the method including:

a first process of forming a first interlayer insulating film in a manner that the first interlayer insulating film covers a scanning line after the scanning line has been formed on a transparent substrate and forming a semiconductor layer on the first interlayer insulating film;

a second process of forming a drain electrode and a source electrode on the semiconductor layer to form the first and second driving elements and forming the first and second pixel electrodes on the first interlayer insulating film and the first data line to be connected to the drain electrode of one of the first or second driving elements;

a third process of forming a contact hole in a second interlayer insulating film after the second interlayer insulating film has been formed in a manner that the second interlayer insulating film covers the driving element and forming the second data line to be connected to the drain electrode of another driving element through the contact hole in a manner that the first data line is overlaid by the second data line with the second interlayer insulating film being interposed between the first and second data lines.

In the foregoing, a preferable mode is one wherein, in the third process, as the second interlayer insulating film, an organic insulating film or an inorganic insulating film or a stacked layer made up of both the organic insulating film and the inorganic insulating film is formed.

With the above configurations, the first and second data lines each feeding a pixel voltage being different in polarity to each of the first and second pixel electrodes through each of the first and second TFTs are formed in such a manner that the first data line is overlaid by the second data line with the insulating film being interposed between the first and second data lines and therefore an area occupied by the data lines in a unit pixel can be reduced, showing no difference in the area to be occupied by the data line between the case of using two data lines and a case of using only one data line. Moreover, since known processes of forming thin films including conductive films and insulating films and known thin film patterning processes are used in combination, the LCD can be manufactured easily without causing an increase in costs. Therefore, even when only pixels each having a same polarity are displayed on a screen, an occurrence of strong flicker can be avoided without causing a decrease in the aperture rate.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
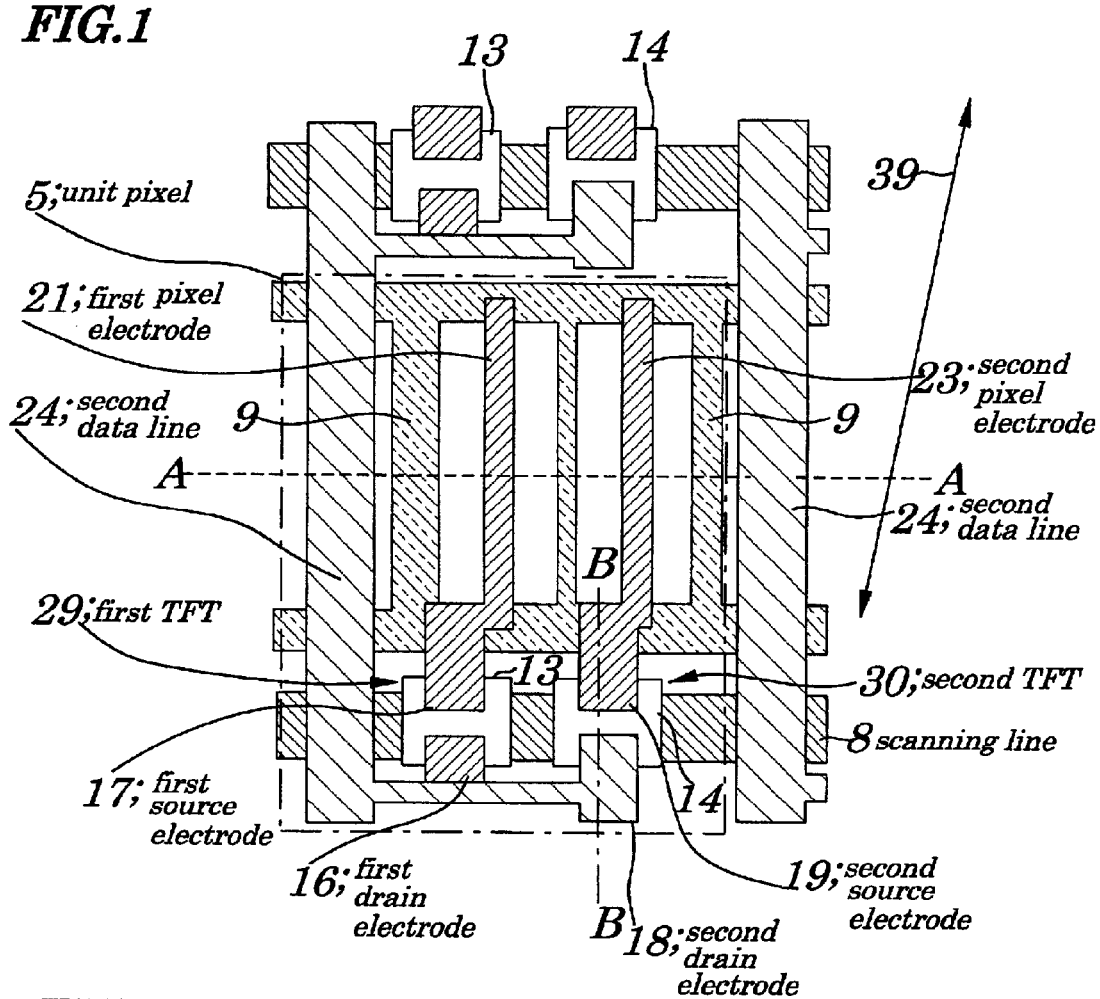
FIG. 1 is a plan view showing configurations of an LCD according to a first embodiment of the present invention.
Figure 2:
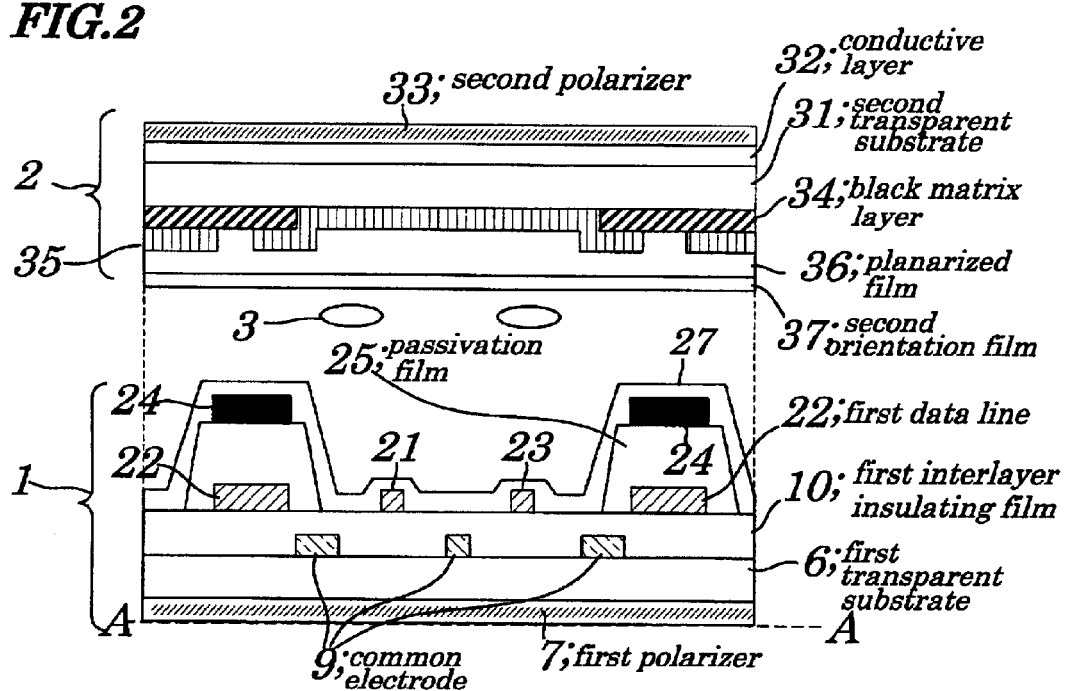
FIG. 2 is a cross-sectional view of FIG. 1 taken along a line A—A.
Figure 3:
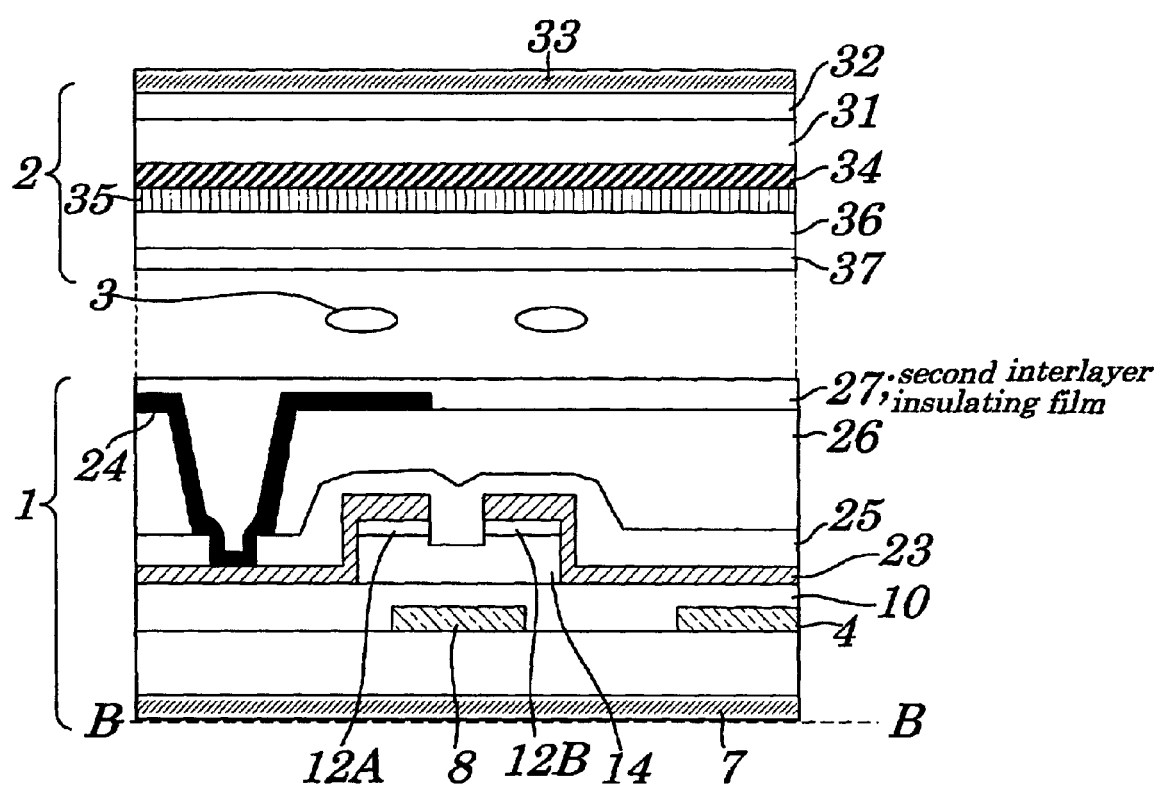
FIG. 3 is a cross-sectional view of FIG. 1 taken along a line B—B.
Figure 4:
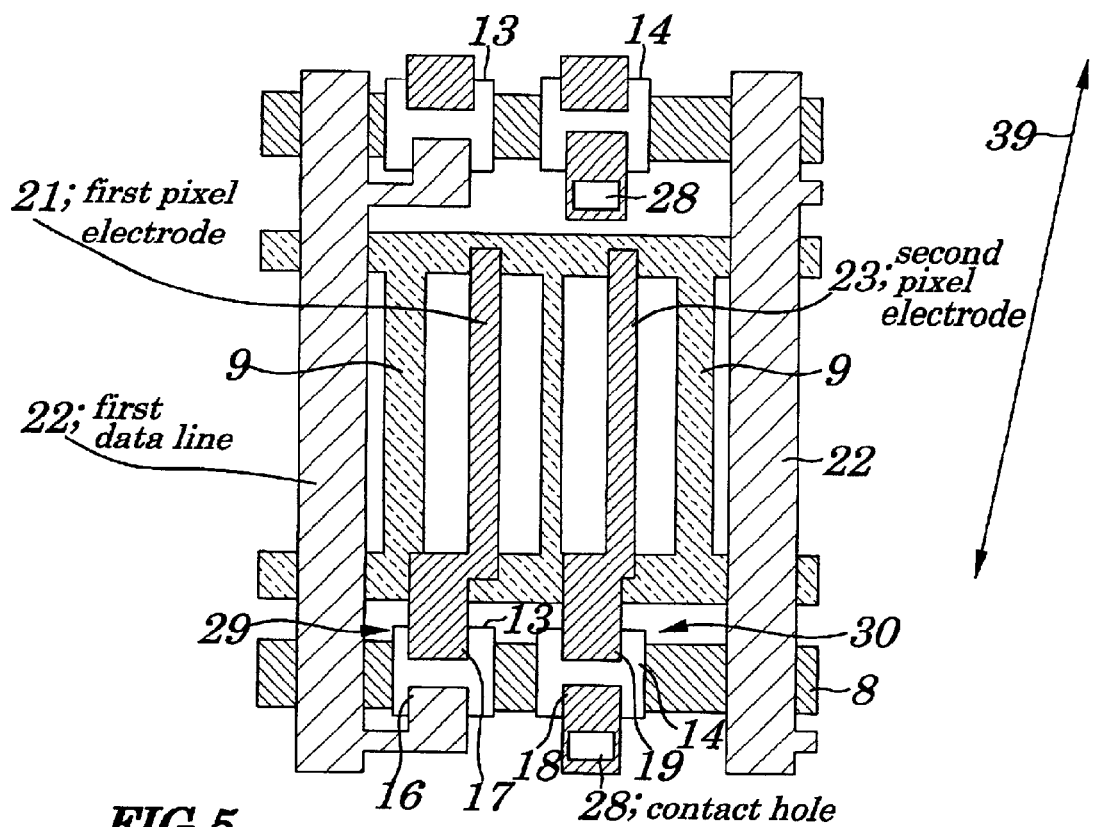
FIG. 4 is a plan view showing configurations of the LCD with a second data line being removed from the configurations of the LCD shown in FIG. 1.
Figure 5:
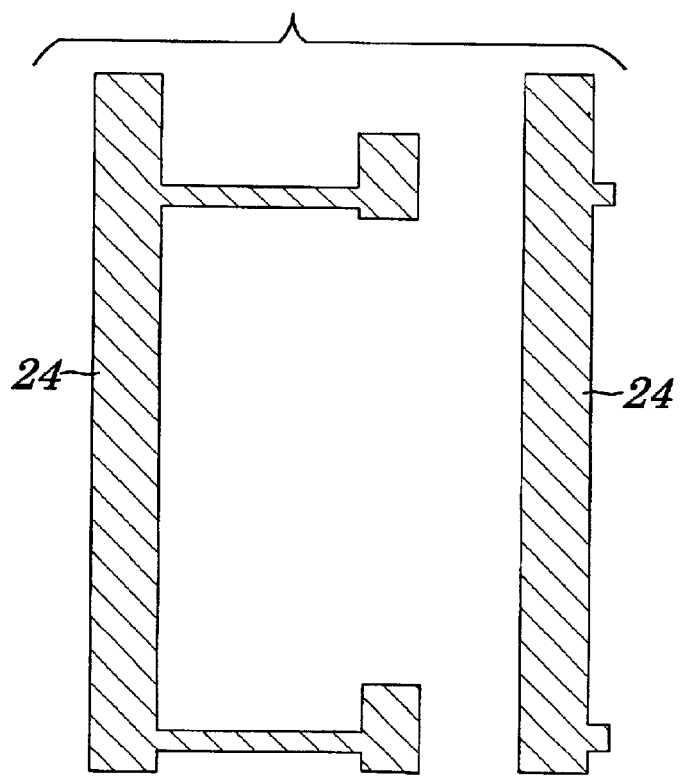
FIG. 5 is a plan view illustrating a pattern of the second data line of the LCD according to the first embodiment.
Figure 6:
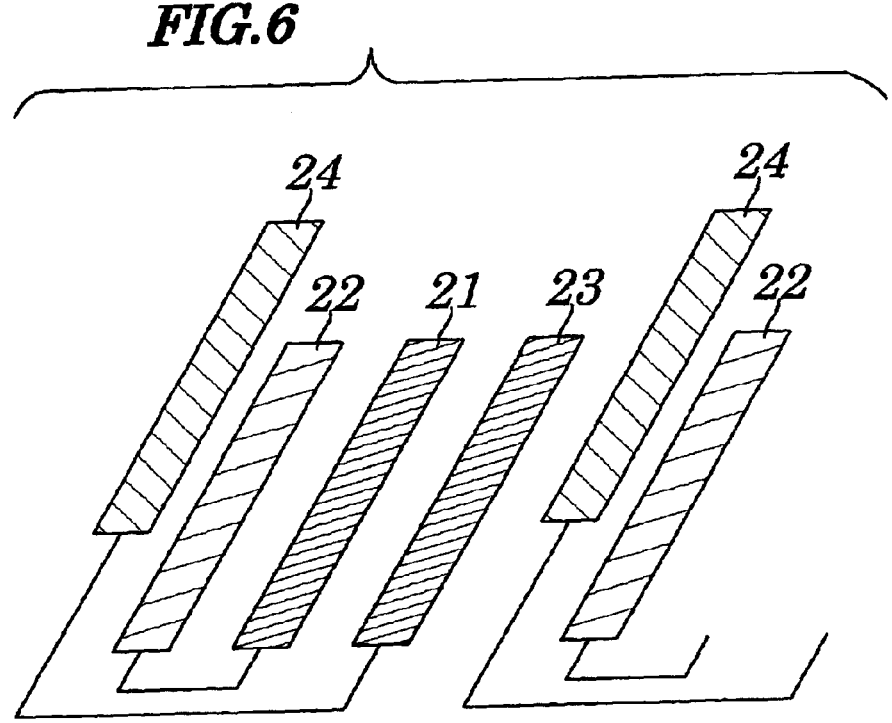
FIG. 6 is a diagram schematically showing a relation of connection and arrangement between data lines and pixel electrodes according to the first embodiment of the present invention.
Figure 7:
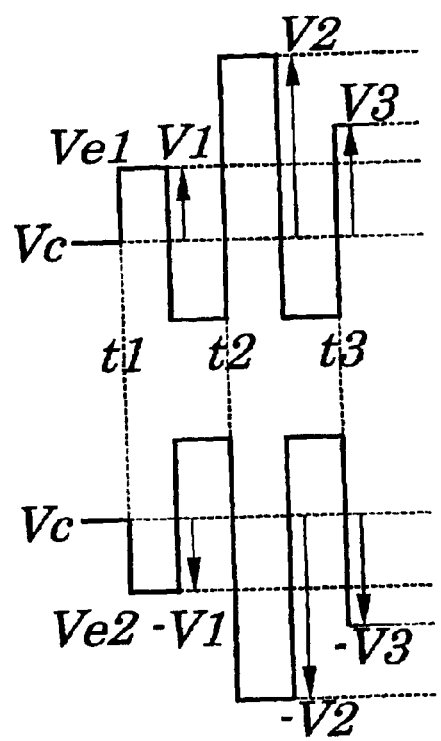
FIG. 7 is a diagram showing a waveform of a pixel voltage fed from the data lines according to the first embodiment of the present invention.

FIG. 1 is a plan view showing configurations of an LCD according to a first embodiment of the present invention. FIG. 2 is a cross-sectional view of FIG. 1 taken along a line A—A. FIG. 3 is a cross-sectional view of FIG. 1 taken along a line B—B. FIG. 4 is a plan view showing configurations of the LCD with a second data line 24 being removed from the configurations of the LCD of FIG. 1. FIG. 5 is a plan view illustrating a pattern of the second data line 24 of the LCD according to the first embodiment. FIG. 6 is a diagram schematically showing a relation of connection and arrangement between data lines, first data lines 22 and second data lines 24, and pixel electrodes, first pixel electrodes 21 and second pixel electrodes 23, according to the first embodiment. FIG. 7 is a diagram showing a waveform of pixel voltages Ve1, Ve2 fed from the data lines 22, 24 according to the first embodiment. In the first embodiment, an example is provided in which the present invention is applied to an IPS-type LCD and configurations of one unit pixel 5 only is shown therein.

In the LCD of the first embodiment, as shown in FIGS. 1 to 5, a liquid crystal 3 is put in a hermetically sealed manner between a TFT substrate 1 and a facing substrate 2. The TFT substrate 1 includes a first transparent substrate 6 made of glass or a like, a first polarizer 7 formed on a rear of the first transparent substrate 6, a scanning line 8 serving as a gate bus line made of aluminum (Al), chromium (Cr), molybdenum (Mo) or a like formed on a part of a surface of the first transparent substrate 6, common electrodes 9 made of Al, Cr, Mo, or a like formed on an other part of the surface of the first transparent substrate 6, a first interlayer insulating film 10 serving as a gate insulating film made up of a silicon oxide ($SiO_x$) film, a silicon nitride ($SiN_x$) film, a stacked layer made up of both the $SiO_x$ film and $SiN_x$ film or a like, a first semiconductor layer 13 made of amorphous silicon (a-Si) with a first pair of ohmic layers (not shown) made of highly-concentrated n⁺-type amorphous silicon (n⁺-type a-Si) formed on a surface of the first semiconductor layer 13 and a second semiconductor layer 14 also made of a-Si with a second pair of ohmic layers 12A and 12B made of highly-concentrated n⁺-type a-Si formed on a surface of the second semiconductor layer 14, both being formed on the first interlayer insulating film 10 in a manner so as to be positioned above the scanning line 8 with the first interlayer insulating film 10 being interposed between the first and second semiconductor layers 13 and 14 and the scanning line 8, a first drain electrode 16 made of Al, Cr, Mo, or a like being formed so as to be connected to a pair of the first ohmic layer (not shown) on the first semiconductor layer 13, a first source electrode 17 made of Al, Cr, Mo, or a like being formed so as to be connected to the first ohmic layer (not shown) on the first semiconductor layer 13, a second drain electrode 18 made of Al, Cr, Mo, or a like being formed so as to be connected to the second ohmic layer 12A on the second semiconductor layer 14, a second source electrode 19 made of Al, Cr, Mo, or a like being formed so as to be connected to the second ohmic layer 12B on the second semiconductor layer 14, a first pixel electrode 21 and first data line 22 both being made of Al, Mo, titanium (Ti), or a like and being formed on the first interlayer insulating film 10 in a manner so as to be integral with the first drain electrode 16 and the first source electrode 17, a second pixel electrode 23 made of Al, Mo, Ti, or a like being formed on the first interlayer insulating film 10 in a manner so as to be integral with the second drain electrode 18 and second source electrode 19, the second data line 24 formed in a manner that the first data line 22 is overlaid by the second data line 24 with a passivation film 25 being interposed between the first data line 22 and the second data line 24, a second interlayer insulating film 26 made up of the $SiO_x$ film, $SiN_x$ film, stacked layer made up of both the $SiO_x$ film and $SiN_x$ film, composite film with an organic film or a like being formed on the passivation film 25 on the first and second semiconductor layers 13 and 14, and a first oriented film 27 formed in a manner so as to cover the first and second pixel electrodes 21 and 23 and the second data line 24.

On the other hand, the facing substrate 2 includes a second transparent substrate 31 made of glass or a like, a second polarizer 33 on a rear of the second transparent substrate 31 with a conductive layer 32 for prevention of static electricity being interposed between the second polarizer 33 and the second transparent substrate 31, a black matrix layer 34 formed on a surface of the second transparent substrate 31, a colored layer 35 serving as a color filter being formed in a manner so as to cover the black matrix 34, a planarized film 36 formed in a manner so as to cover the black matrix layer 34 and the colored layer 35, and a second oriented film 37 formed on the planarized film 36. An arrow line 39 shows an oriented direction of the liquid crystal 3.

In the LCD having such configurations as described above, the scanning line 8, the first semiconductor layer 13, the first drain electrode 16, and the first source electrode 17 make up a first TFT 29. Similarly, the scanning line 8, the second semiconductor layer 14, the second drain electrode 18, and the second source electrode 19 make up a second TFT 30. Since the first TFT 29 and the second TFT 30 are formed commonly on the scanning line 8 with the first interlayer insulating film 10 being interposed between the first and second TFTs 29 and 30 and the scanning line 8, both the first and second TFTs 29 and 30 are driven by the same scanning line 8. The first data line 22 and second data line 24 are formed so as to have patterns being similar to each other. The first data line 22 is connected to the first drain electrode 16 of the first TFT 29 which exists in the vicinity of the first data line 22. On the other hand, the second data line 24 is formed so as to have a pattern as shown in FIG. 5 and is connected to the second drain electrode 18 of the second TFT 30 existing outside the first TFT 29 via a contact hole 28 formed in the passivation film 25 and second interlayer insulating film 26. Thus, a pixel voltage fed from the first data line 22 is applied to the first pixel electrode 21 through the first TFT 29. On the other hand, a pixel voltage fed from the second data line 24 is applied to the second pixel electrode 23 through the second TFT 30. FIG. 6 is a diagram schematically showing a relation of connection and arrangement between the first and second data lines 22 and 24 and the first and second pixel electrodes 21 and 23 according to the first embodiment.

Next, a method for driving the LCD of the first embodiment will be described by referring to a waveform of a signal voltage shown in FIG. 7. FIG. 7 shows a waveform of a first pixel voltage Ve1 fed from the first data line 22, a waveform of a second pixel voltage Ve2 fed from the second data line 24 and a common voltage Vc. The first pixel voltage Ve1 changes, relative to the common voltage Vc being used as a reference level, in a manner that it becomes a positive voltage V1 at time t1, a positive voltage V2 at time t2 and a positive voltage V3 at time t3. The second pixel voltage Ve2 has a polarity opposite to the first pixel voltage Ve1. That is, the second pixel voltage Ve2 changes, relative to the common voltage Vc, in a manner that it becomes a negative voltage –V1 at the time t1, a negative voltage –V2 at the time t2 and a negative voltage –V3 at the time t3. The first pixel voltage Ve1 is applied from the first data line 22 through the first TFT 29 to the first pixel electrode 21 and, at the same time, the second pixel voltage Ve2 is applied from the second data line 24 through the second TFT 30 to the second pixel electrode 23. As a result, the polarity of the pixel voltage applied to the first pixel electrode 21 is always opposite to that of the pixel voltage applied to the second pixel electrode 23 and the liquid crystal 3 holds an electric charge corresponding to the applied pixel voltage.

Thus, by reversing the polarity of the pixel voltage to be applied to the first and second pixel electrodes 21 and 23 to a positive side or negative side or vice versa for every unit pixel 5, since it is possible to surely make a pixel of a positive polarity and a pixel of a negative polarity both providing approximately same luminance be disposed adjacent to each other for every unit pixel 5, even if only pixels each having a same polarity are displayed on a screen, the occurrence of strong flicker can be avoided. These effects can be obtained by any of the three driving methods described above. Moreover, in the LCD of the first embodiment, the first and second data lines 22 and 24 are formed in such a manner that the first data line 22 is overlaid by the second data line 24 with the passivation film 25 being interposed between the first data line 22 and the second data line 24 and therefore an increase in an area by being occupied by the two data lines 22, 24 within the unit pixel 5 can be avoided, showing no difference in the area to be occupied by the data line 22 or 24 between the case of using two data lines 22, 24 and a case of using only one data line 22 or 24, which makes it possible to improve an aperture rate. In such the IPS-type LCD as employed in the embodiment in particular, since the first and second pixel electrodes 21 and 23 and the common electrode 9 are made up of a light-shielding metal such as Al, Cr, Mo, Ti, or a like which has originally made the aperture rate lower, the effect that can be obtained in the embodiment is greater.

Since the first and second pixel electrodes 21 and 23 and the second data line 24 are formed so as to face the liquid crystal 3 with the first oriented film 27 being interposed between the first and second pixel electrodes 21 and 23 and the second data line 24 and the liquid crystal 3 and since a thickness of the first oriented film 27 is so small as about 50 nm, a stable metal that would not dissolve in the liquid crystal 3 has to be selected. Such metals as Al, Mo, Ti, combined metal of them, or a like described above can meet the above requirement. Moreover, a waveform of the pixel voltage to be fed to both the first and second data lines 22 and 24 is distorted in proportion to an increase in areas in which the first data line 22 is overlaid by the second data line 24, it is preferable to reduce a line width of either of the first data line 22 or the second data line 24. Also, it is desirable that a metal is used that can make a wiring resistance of the second data line 24 lower than that of the first data line 22. It is further desirable that the passivation film 25 being interposed between the first data line 22 and the second data line 24 is so formed as to be large in thickness and an insulating film made up of an organic material having small dielectric constant or its stacked film is selected as a material for the passivation film 25. As shown in Tables 1, 2, and 3, the passivation film 25 can be constructed (1) by using only inorganic films, (2) by using stacked films made up of inorganic films and organic films, or (3) by using only organic films.

TABLE 1

| | Material | Thickness | Dielectric constant |
|---|---|---|---|
| (1) By using only inorganic films | $SiN_x$ film | 1 μm to 3 μm | 6.4 |
| | $SiN_x/SiO_x$ film | 1 μm/0.5 μm | 6.4/4.0 |
| | Inorganic polysilazane film | 1 μm to 2 μm | 4.5 |
| | $SiN_x$/Inorganic polysilazane film | 0.15 μm/1 μm to 2 μm | 6.4/4.5 |

| Deposition method | Processing method |
|---|---|
| Plasma CVD | Dry etching using photoresist as mask |
| Plasma CVD/Sputtering | Dry etching using photoresist as mask |
| Spin coating and burn-in | Dry etching using photoresist as mask |
| Plasma CVD/Spin coating and burn-in | Dry etching using photoresist as mask |

TABLE 2

| | Material | Thickness | Dielectric constant |
|---|---|---|---|
| (2) by stacked layer made of inorganic films and organic films | $SiN_x$/Photo-sensitive acrylic resin film | 0.15 μm/1 μm to 2 μm | 6.4/3.3 |
| | $SiN_x$/Photo-sensitive polyimide resin film | 0.15 μm/1 μm to 2 μm | 6.4/— |

| Deposition method | Processing method |
|---|---|
| Plasma CVD/Spin coating | Pattern formation by exposure and development and then burn-in for photosensitive acrylic resin/dry etching for $SiN_x$ |
| Plasma CVD/Spin coating | Pattern formation by exposure and development and then burn-in for photosensitive polyimide resin/dry etching for $SiN_x$ |

TABLE 3

| | Material | Thickness | Dielectric constant |
|---|---|---|---|
| (3) by using only organic films | BCB (benzo-cyclobutene) film | 1 μm to 2 μm | 4.5 |
| | Organic polysilazane film | 1 μm to 2 μm | 3.8 |
| | Siloxane film | 1 μm to 2 μm | — |

| Deposition method | Processing method |
|---|---|
| Spin coating and burn-in | Dry etching using photoresist as mask |
| Spin coating and burn-in | Dry etching using photoresist as mask |
| Spin coating and burn-in | Dry etching using photoresist as mask |

Moreover, in the IPS-type LCD of the embodiment, when a transverse electric field is generated by the first and second pixel electrodes 21 and 23 and the common electrodes 9, it is desirable that no passivation film 25 exists on surfaces of the first and second pixel electrodes 21 and 23 or, even if it exists as shown in FIG. 2, a thickness of the passivation film 25 is made smaller so that the transverse electric field is easily applied to the liquid crystal 3.

Thus, according to the LCD of the embodiment, the first and second data lines 22 and 24 each applying a pixel voltage having a different polarity to the first and second pixel electrodes 21 and 23 through each of the first and second TFTs 29 and 30 are formed in such a manner that the first data line 22 is overlaid by the second data line 24 with the passivation film 25 being interposed between the first data line 22 and the second data line 24 and therefore an increase in the area by being occupied by the first and second data lines 22 and 24 within the unit pixel 5 can be avoided, showing no difference in the area to be occupied by the data line between a case of using two data lines 22, 24 and a case of using only one data line 22 or 24. Therefore, even when only unit pixels 5 having a same polarity are displayed on a screen, the occurrence of strong flicker can be inhibited without causing an decrease in the aperture rate.

Second Embodiment

Figure 8:
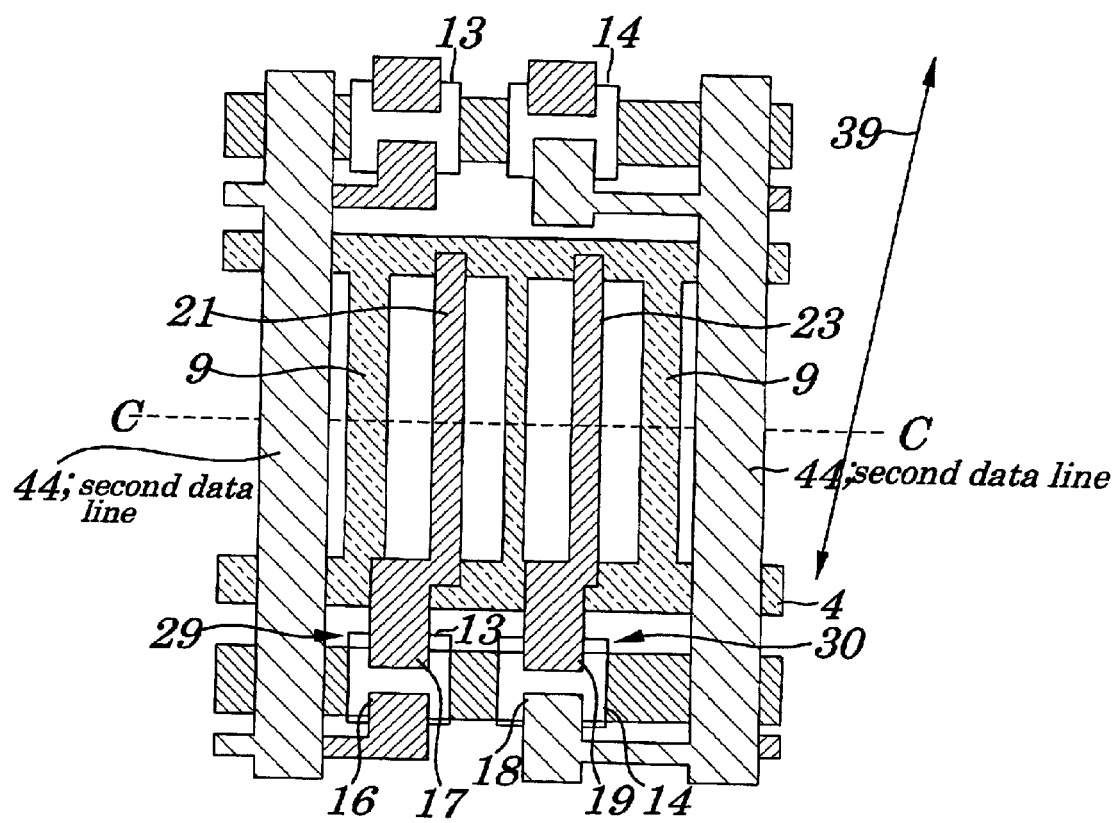
FIG. 8 is a plan view showing configurations of an LCD according to a second embodiment of the present invention.
Figure 9:
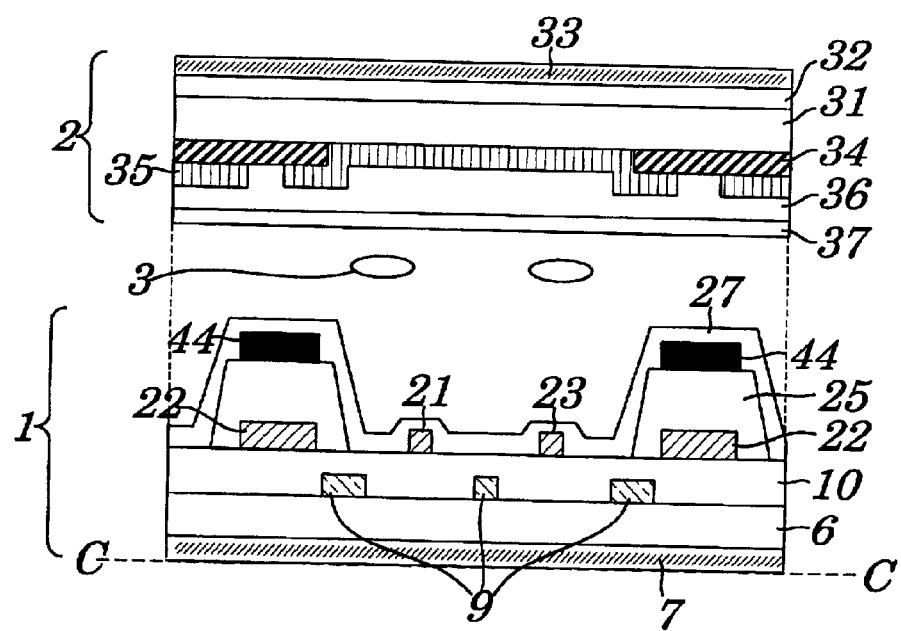
FIG. 9 is a cross-sectional view of FIG. 8 taken along a line C—C.
Figure 10:
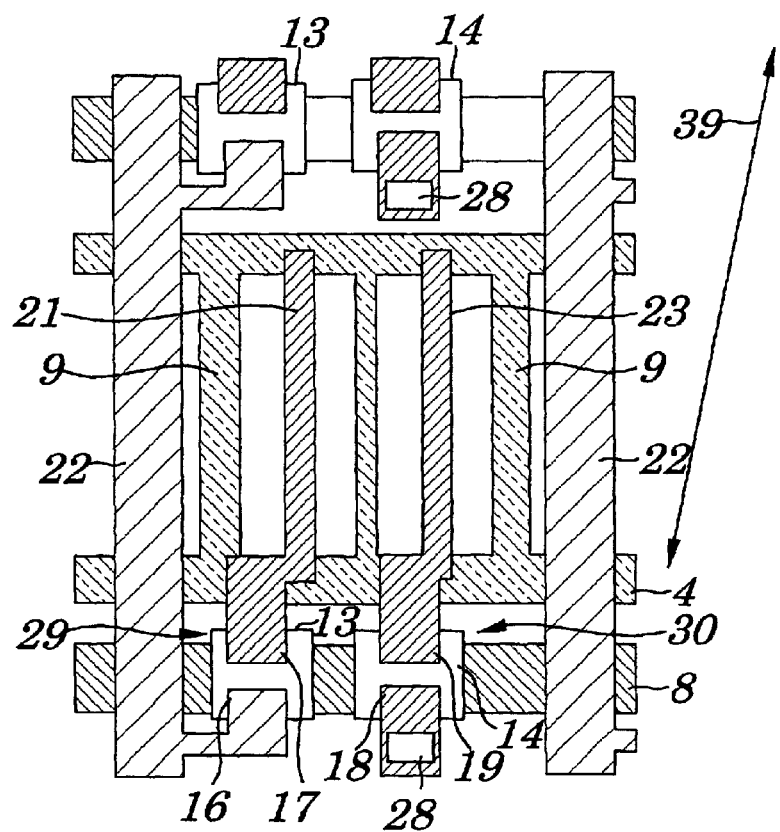
FIG. 10 is a plan view showing configurations of the LCD with a second data line being removed from the configurations of the LCD shown in FIG. 8.
Figure 11:
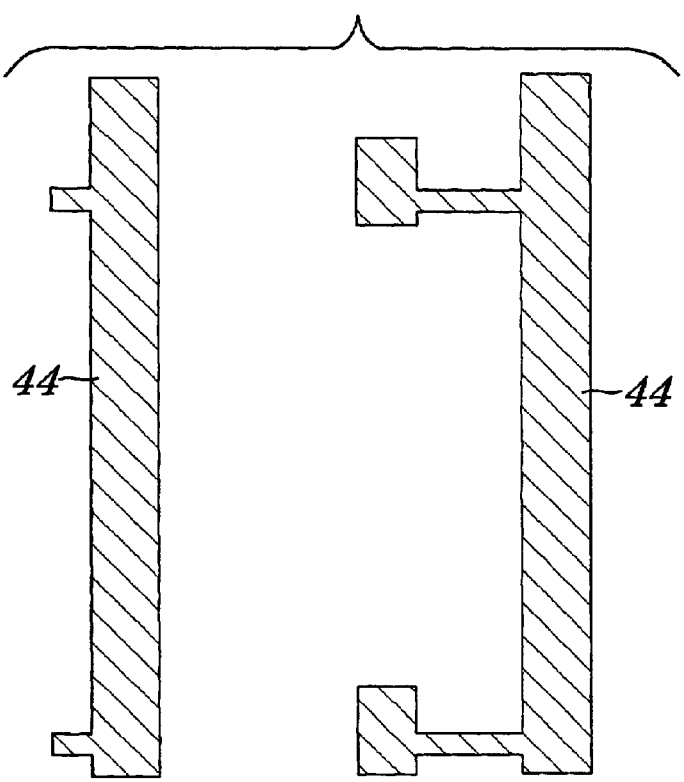
FIG. 11 is a plan view showing a pattern of the second data line employed in the second embodiment of the present invention.
Figure 12:
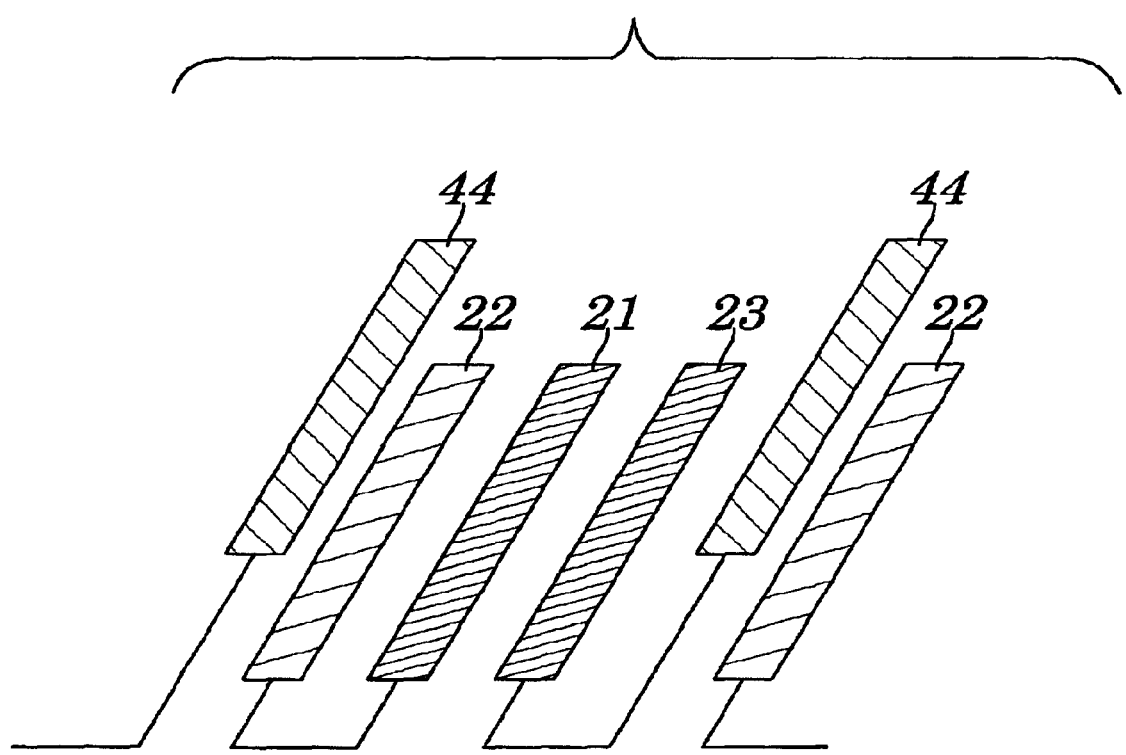
FIG. 12 is a diagram schematically showing a relation of connection and arrangement between data lines and pixel electrodes employed in the second embodiment of the present invention.

FIG. 8 is a plan view showing configurations of an LCD according to a second embodiment of the present invention. FIG. 9 is a cross-sectional view of FIG. 8 taken along a line C—C. FIG. 10 is a plan view showing configurations of the LCD with a second data line 44 being removed from the configurations of the LCD shown in FIG. 8. FIG. 11 is a plan view showing a pattern of the second data line 44 employed in the LCD of the second embodiment. FIG. 12 is a diagram schematically showing a relation of connection and arrangement between data lines 22, 44 and pixel electrodes 21, 23 according to the second embodiment.

Configurations of the LCD of the second embodiment differ greatly from those in the first embodiment in that the relation of connection between the two pixel electrodes 21, 23 and the two data lines 22, 44 is maintained but a relation of arrangement of both the data lines 22, 44 is changed.

That is, in the LCD of the second embodiment, as shown in FIGS. 8 to 11, instead of a second data line 24 used in the first embodiment, the second data line 44 having a pattern shape being different from that of the second data line 24 in the first embodiment is employed. The LCD of the embodiment is so configured that a first data line 22 is connected through a first TFT 29 to a first pixel electrode 21 in one unit pixel 5, while the new second data line 44 existing in an adjacent unit pixel 5 is connected through a second TFT 30 to a second pixel electrode 23. FIG. 12 is a diagram schematically showing a relation of connection and arrangement between the first and second data lines 22 and 44 and the first and second pixel electrodes 21 and 23.

In the embodiment, as is apparent from FIG. 12, since the first data line 22 to apply a first pixel voltage to the first pixel electrode 21 in a unit pixel and the second data line 44 to apply a second pixel voltage being different from the first pixel voltage in polarity to the second pixel electrode 23 existing in an adjacent unit pixel 5 are so formed that the first data line 22 is overlaid by the second data line 44 with a passivation film 25 being interposed between the first data line 22 and second data line 44, the polarity of the pixel voltages to be applied by the first data line 22 and second data line 44 being formed so that the first data line 22 is overlaid by the second data line 44 can be made the same. As a result, an influence on potentials exerted mutually by both the data lines 22 and 44 can be reduced. Except the above points, the configurations of the LCD of the second embodiment are the same as those in the first embodiment. Therefore, in FIGS. 8 to 10, same reference numbers are assigned to corresponding components having same functions as those in FIGS. 1 to 4 and their descriptions are omitted accordingly.

Thus, approximately the same effects as obtained in the first embodiment can be also achieved in the second embodiment. In addition, in the second embodiment, an influence on potentials mutually exerted by the two data lines 22, 44 can be made smaller.

Third Embodiment

Figure 13:
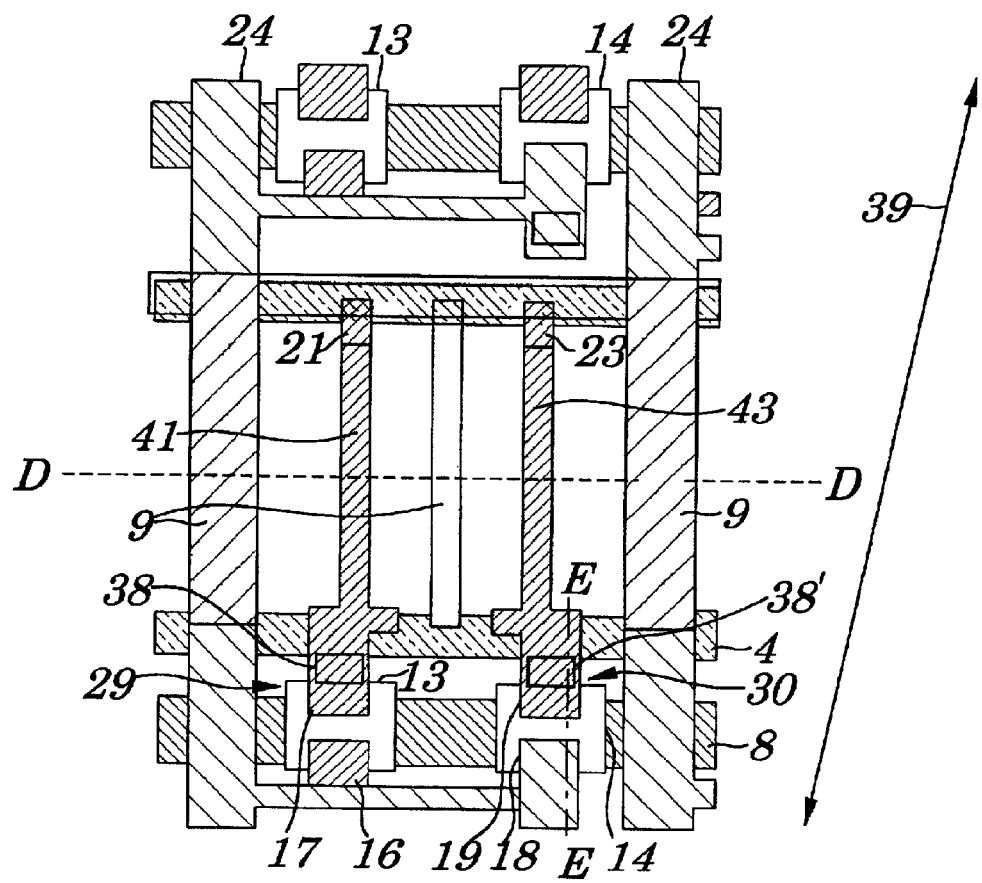
FIG. 13 is a plan view showing configurations of an LCD according to a third embodiment of the present invention.
Figure 14:
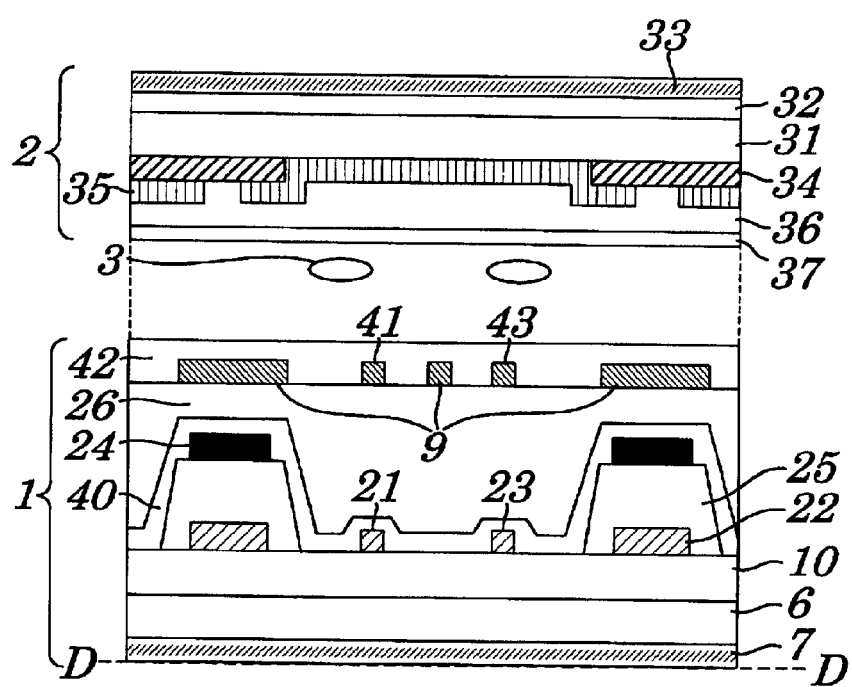
FIG. 14 is a cross-sectional view of FIG. 13 taken along a line D—D.
Figure 15:
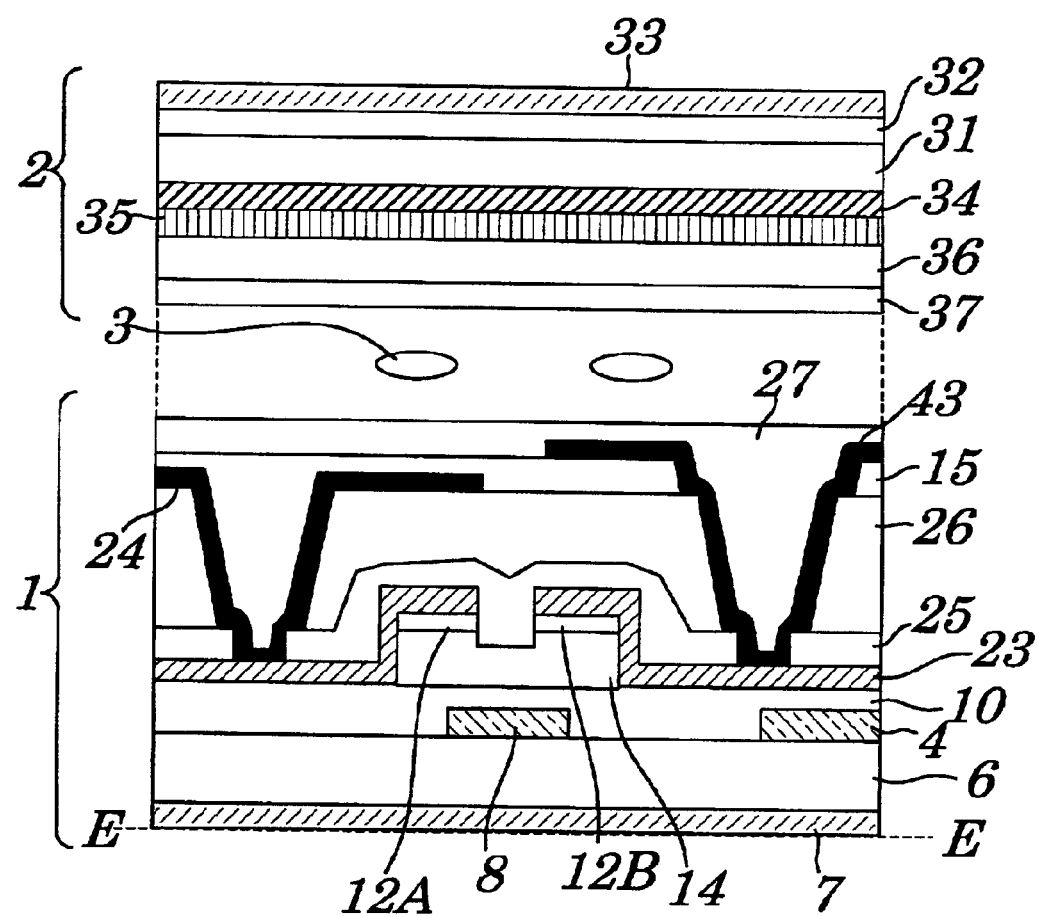
FIG. 15 is a cross-sectional view of FIG. 13 taken along a line E—E.
Figure 21:
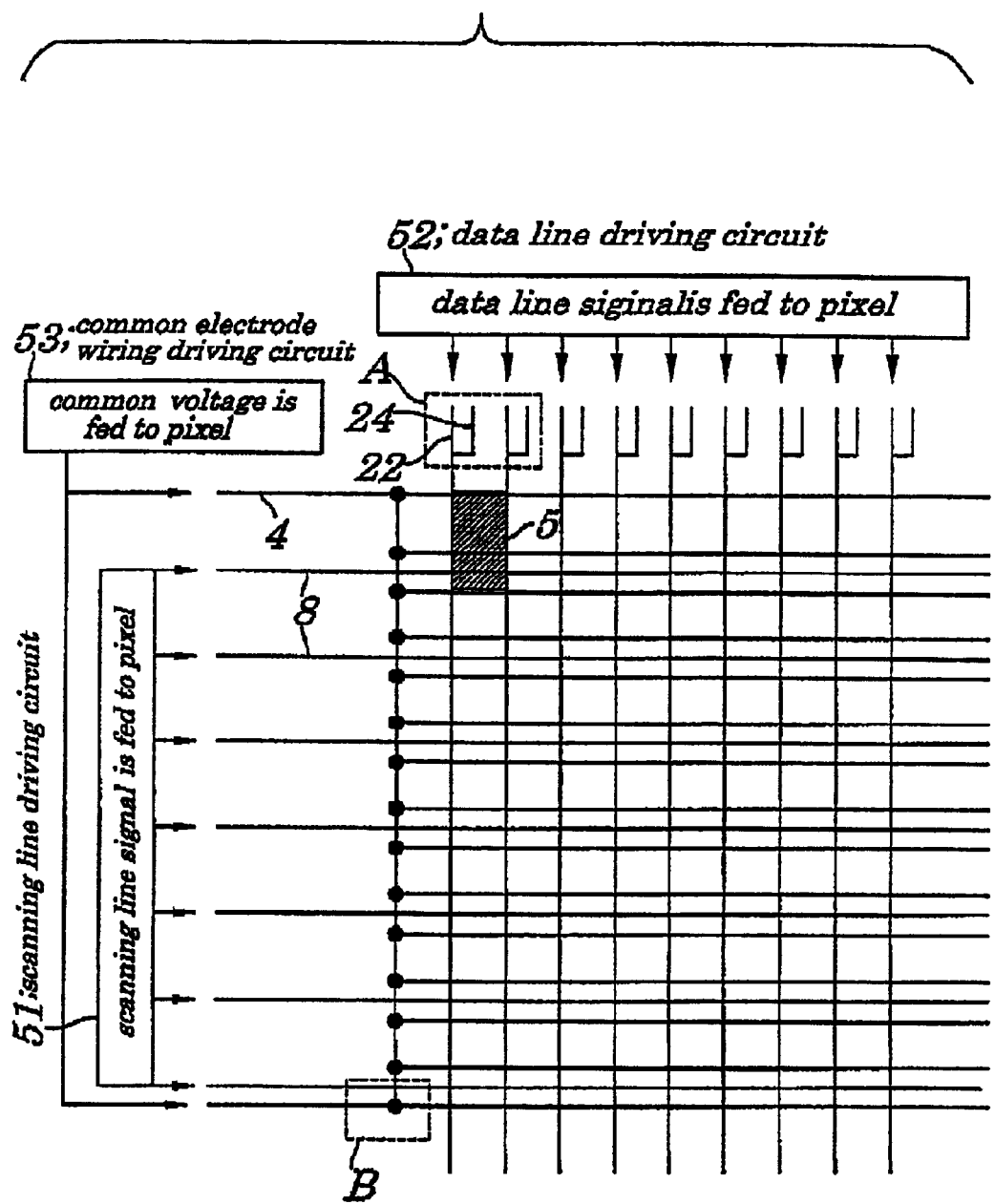
FIG. 21 is a diagram showing configurations of a driving circuit employed in the LCD of the third embodiment of the present invention.
Figure 22:
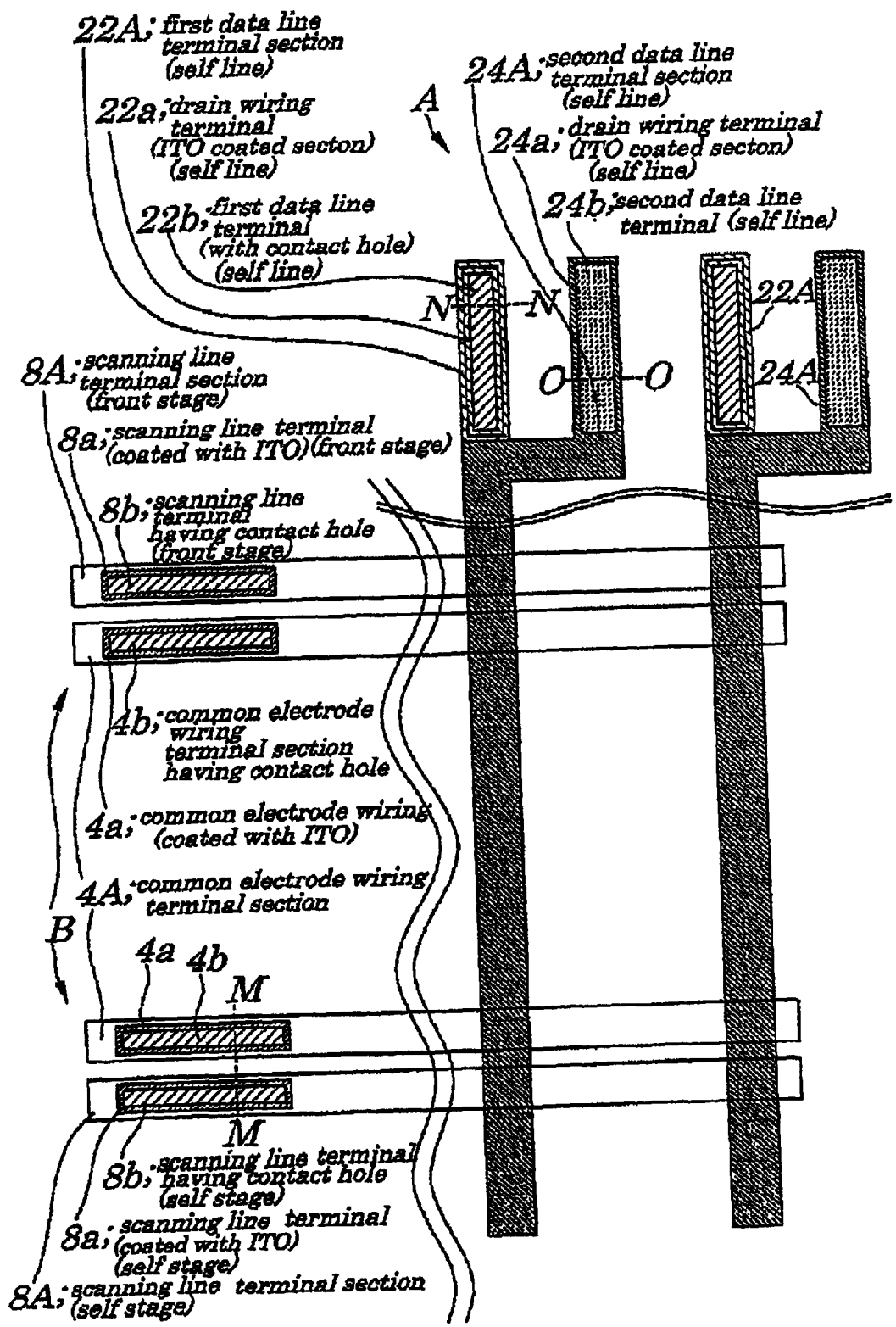
FIG. 22 is an expanded diagram showing a terminal section A shown in FIG. 21 and a terminal section B shown in FIG. 21.
Figure 23:
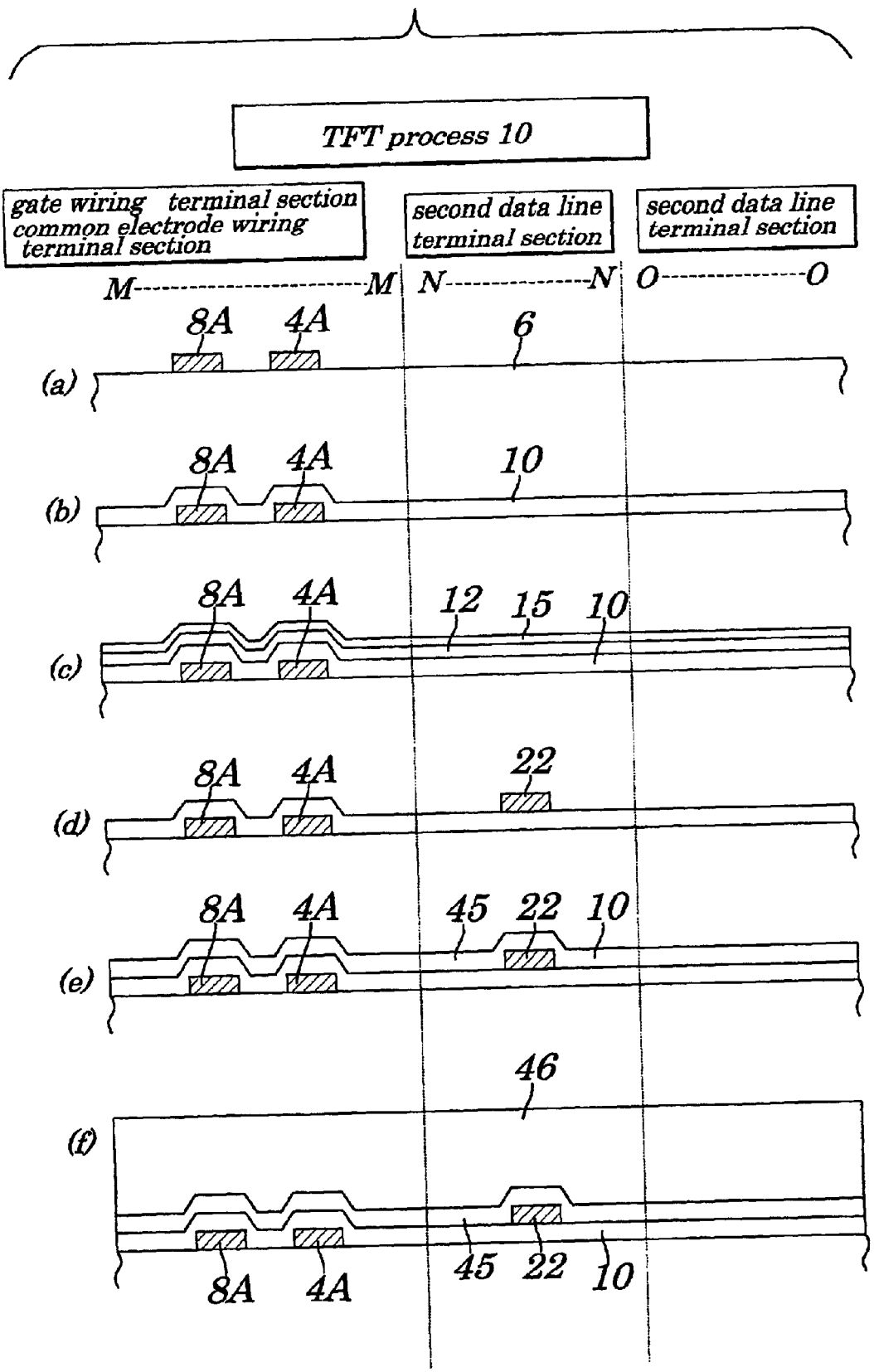
FIG. 23 is a process diagram illustrating another method of manufacturing the LCD in order of processes according to the third embodiment of the present invention.
Figure 24:
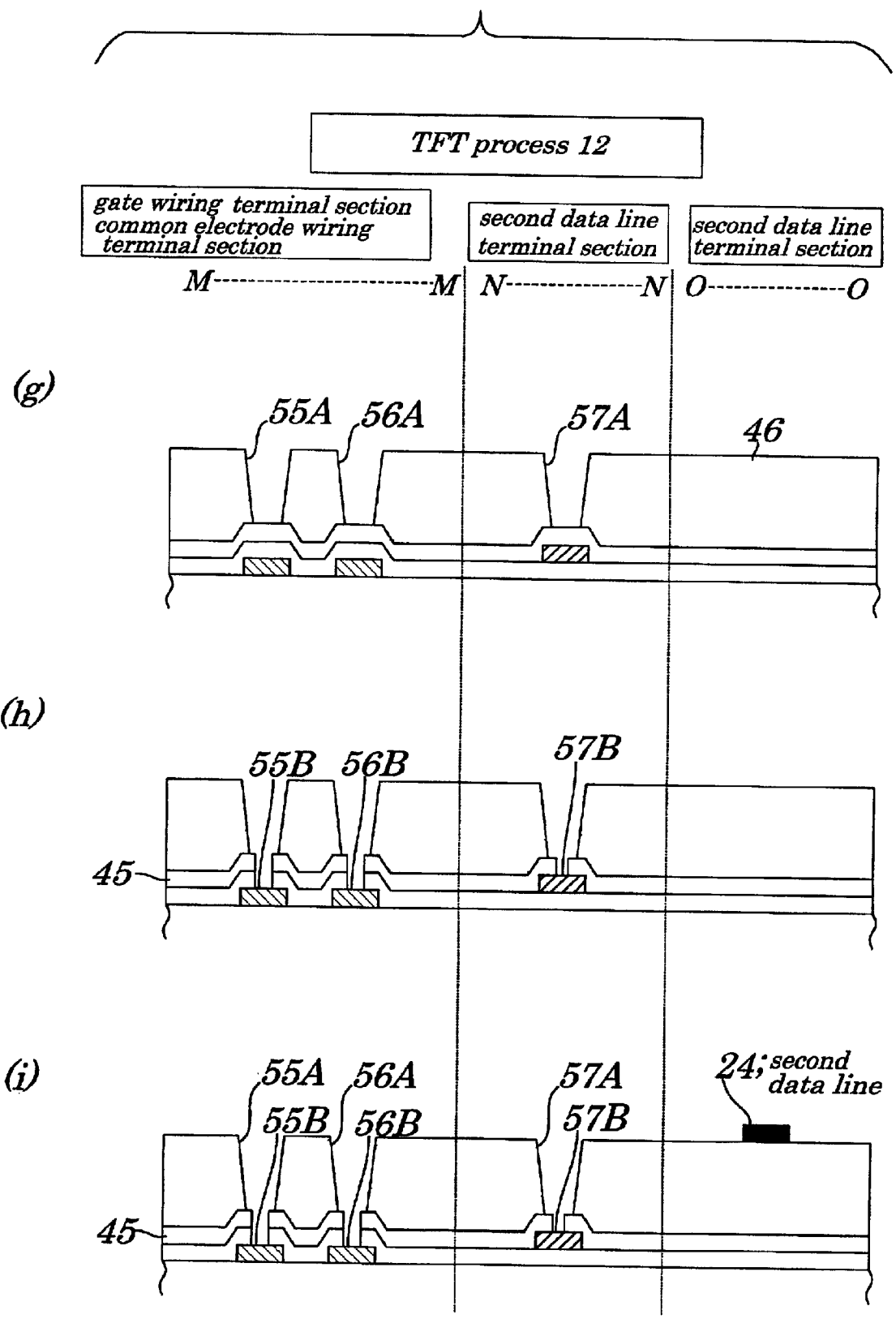
FIG. 24 is a process diagram illustrating another method of manufacturing the LCD in order of processes according to the third embodiment of the present invention.
Figure 25:
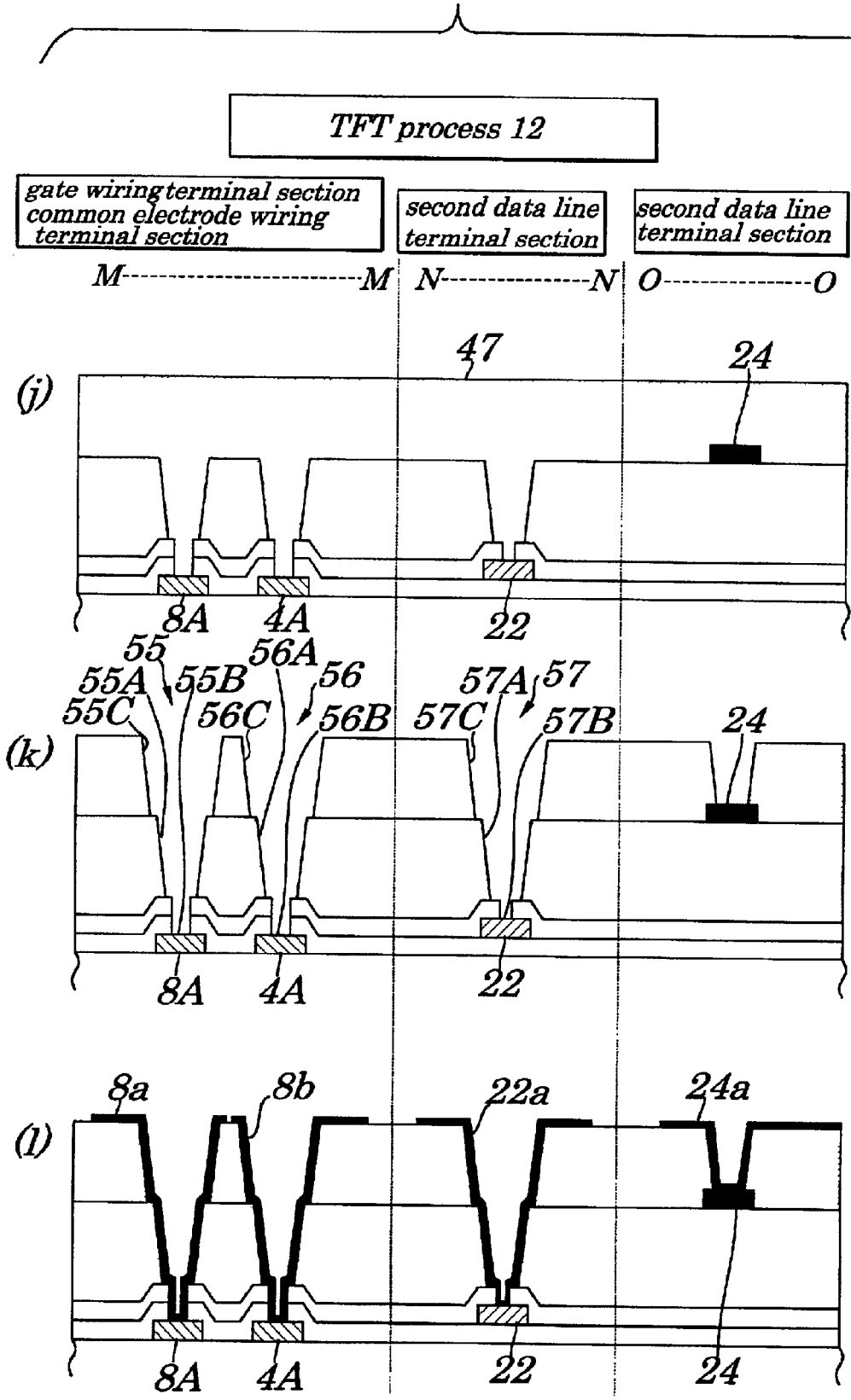
FIG. 25 is a process diagram illustrating another method of manufacturing the LCD in order of processes according to the third embodiment of the present invention.

FIG. 13 is a plan view showing configurations of an LCD according to a third embodiment of the present invention. FIG. 14 is a cross-sectional view of FIG. 13 taken along a line D—D. FIG. 15 is a cross-sectional view of FIG. 13 taken along a line E—E. FIGS. 16 to 20 are process diagrams illustrating a method of manufacturing the LCD in order of processes according to the third embodiment. FIG. 21 is a diagram showing configurations of a driving circuit employed in the LCD of the third embodiment. FIG. 22 is an expanded diagram showing a terminal section A shown in FIG. 21 and a terminal section B shown in FIG. 21. FIGS. 23 to 25 are process diagrams illustrating another method of manufacturing the LCD in order of processes according to the third embodiment. Configurations of the LCD of the third embodiment differ greatly from those in the first embodiment, as shown in FIGS. 13 to 15, in that common electrodes 9 are formed in such a manner that first and second data lines 22 and 24 are overlaid by the common electrodes 9 and in that the common electrodes 9 and first and second pixel electrodes 41 and 43 are formed as a same layer and manufactured by same processes.

That is, in the LCD of the third embodiment, as shown in FIGS. 13 to 15, the second passivation film 40 is formed in a manner so as to cover a first pixel electrode 21, a second pixel electrode 23, and the second data line 24. On the second passivation film 40 are formed the second interlayer insulating film 26 and the third interlayer insulating film 42. On the third interlayer insulating film 42 are formed the first and second pixel electrodes 41 and 43 both being made of ITO (Indium-Tin-Oxide), and the common electrodes 9 also made of ITO. The first pixel electrode 41 is connected to a first source electrode 17 through a contact hole 38 formed in a passivation film 25 and second interlayer insulating film 26. Moreover, the second pixel electrode 43 is connected to a second source electrode 19 through a contact hole 38' formed in the passivation film 25, second interlayer insulating film 26, and third interlayer insulating film 42.

In the LCD of the embodiment, as is apparent from FIGS. 14 and 15, when a transverse electric field is generated by first pixel electrodes 21 and 41, second pixel electrodes 23 and 43 and common electrodes 9, since the first and second pixel electrodes 41 and 43 and the common electrodes 9 are formed in a vicinity of a liquid crystal 3 with a first oriented film 27 being interposed between the liquid crystal 3 and the first and second pixel electrodes 41 and 43 and the common electrodes 9, the transverse electric field can be applied easily to the liquid crystal 3 and a required driving voltage can be lowered. Moreover, since a leakage electric field from the data line can be shielded with the common electrodes 9 formed in the uppermost layer, an area of a black matrix layer 34 can be reduced, which can further more improve an aperture rate.

Next, a method for manufacturing the LCD of the embodiment will be described in order of processes by referring to FIGS. 16 to 20. In FIGS. 16 to 20, portions indicated by symbols M—M, N—N, and O—O correspond respectively to cross-sectional views of FIG. 22 taken along each of lines M—M, N—N, and O—O.

First, as shown in FIG. 16(a), after a Cr film is formed by a sputtering method all over surfaces of a first transparent substrate 6 made of glass or a like, patterning is performed on the Cr film using a wet etching method to form a scanning line 8 and common electrodes 9 each having a desired shape.

Figure 16:
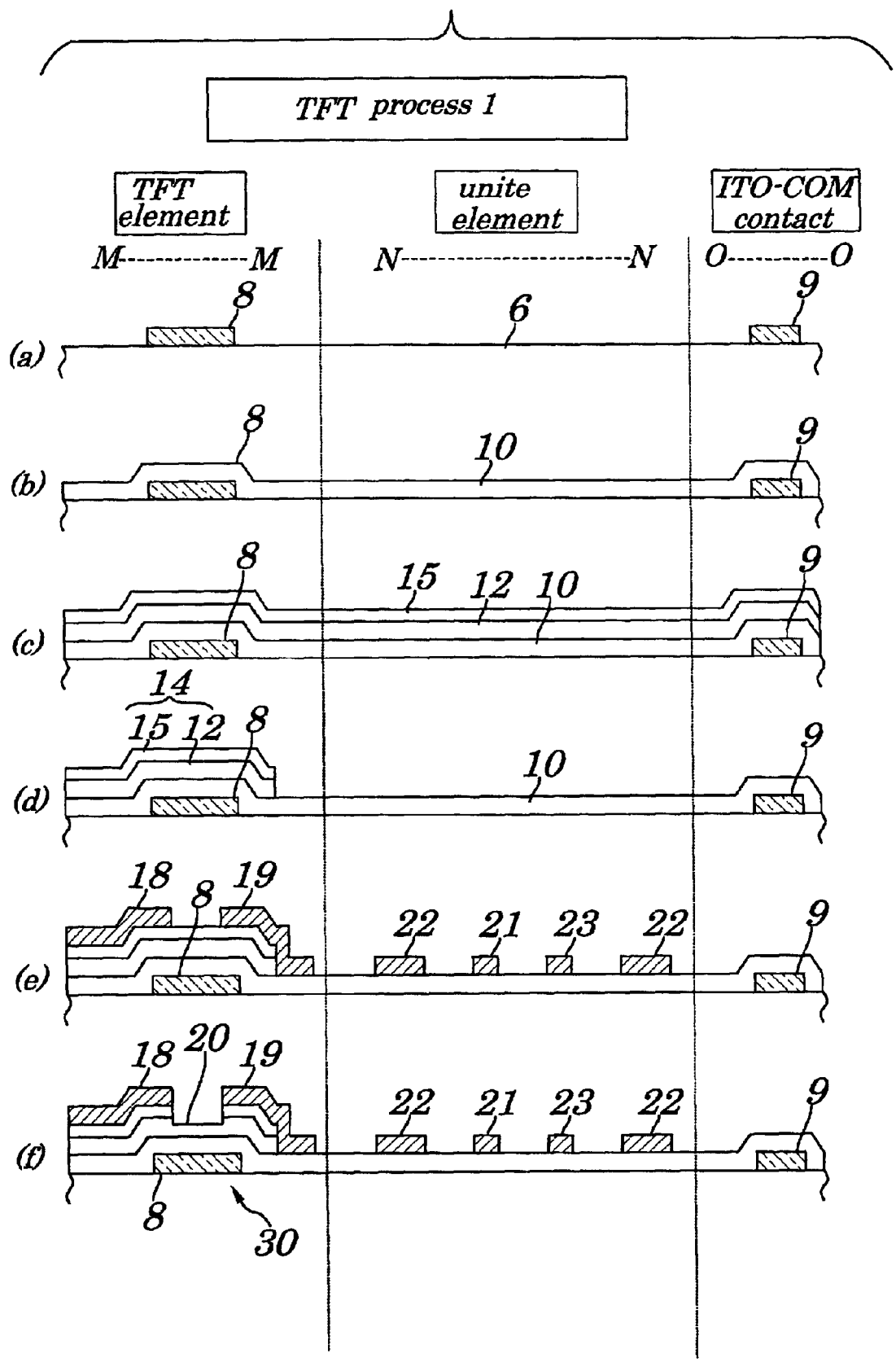
FIG. 16 is a process diagram illustrating a method of manufacturing the LCD in order of processes according to the third embodiment of the present invention.

Next, as shown in FIG. 16 (b), a first interlayer insulating film 10 serving as a gate insulating film made up of a stacked film made up of an $SiO_x$ film and an $SiN_x$ film is formed, by a CVD method, on all surfaces of the scanning line 8, the first transparent substrate 6, and the common electrode 9. Then, as shown in FIG. 16 (c), an a-Si film 12 and an $n^+$-type a-Si film 15 are sequentially formed, by a plasma-CVD method, on all surfaces of the first interlayer insulating film 10.

Then, as shown in FIG. 16 (d), patterning is performed on both the the a-Si film 12 and $n^+$-type a-Si film 15 to form a second semiconductor layer 14 having a desired shape, using a dry-etching method. Next, as shown in FIG. 16 (e), after a Cr layer is formed, by a sputtering method, on all surfaces of the $n^+$-type a-Si film 15 and the first interlayer insulating film 10, a second drain electrode 18, and a source electrode 19, patterning is performed on the Cr layer to form first and second pixel electrodes 21 and 23 each having a desired shape, by using a dry-etching method. Moreover, the first data line 22 in a right side in FIG. 16 (e) is a data line operating in an adjacent unit pixel. Then, as shown in FIG. 16 (f), by selectively etching the second semiconductor layer 14 by using the dry-etching method, a channel groove 20 is formed. By the above processes, a second TFT 30 is formed. Though not shown, a first TFT 29 is formed on an other place of the first transparent substrate 6.

Figure 17:
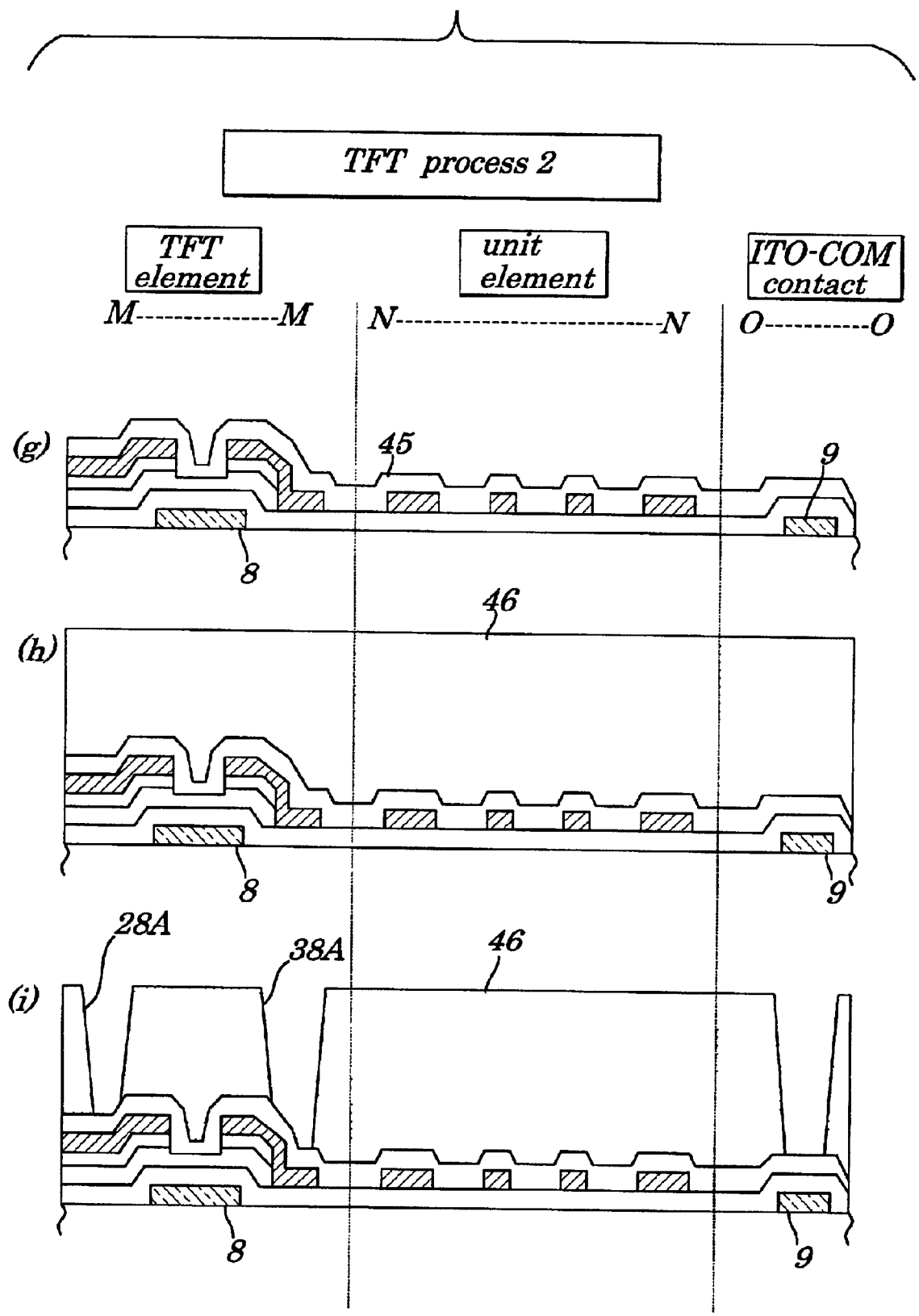
FIG. 17 is a process diagram illustrating the method of manufacturing the LCD in order of processes according to the third embodiment of the present invention.
Figure 18:
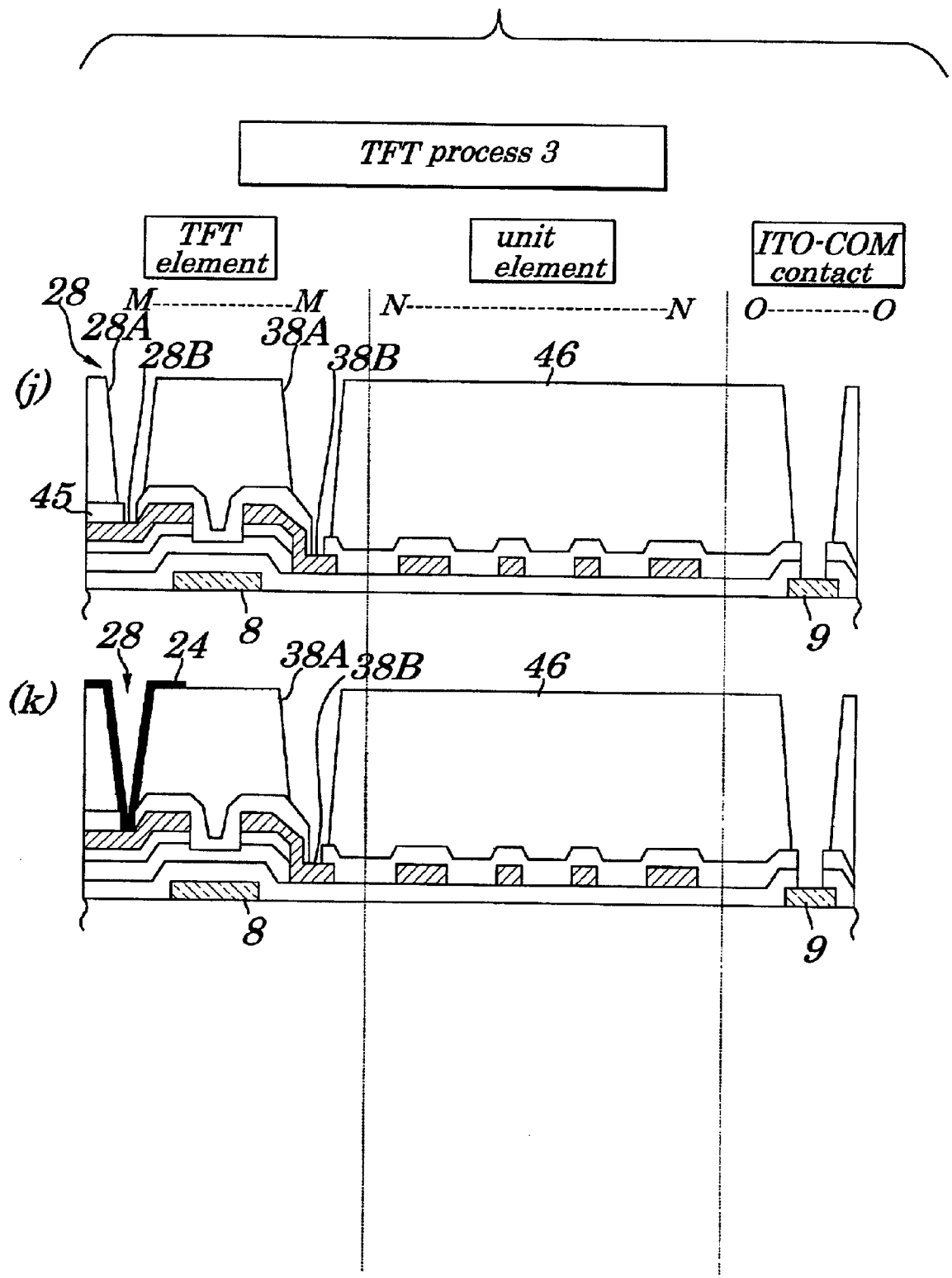
FIG. 18 is a process diagram illustrating the method of manufacturing the LCD in order of processes according to the third embodiment of the present invention.

Next, as shown in FIG. 17 (g), an $SiN_x$ film 45 serving as a passivation film is formed on all surfaces of the above components being exposed, by the CVD method. Then, as shown in FIG. 17 (h), a photosensitive organic insulating film 46 serving as a second interlayer film 26 is formed on all surfaces of the $SiN_x$ film 45 by using a spin coating method. Next, as shown in FIG. 17 (i), contact holes 28A and 38A are formed by performing exposure and development processing on the photosensitive organic insulating film 46. Then, as shown in FIG. 18 (j), contact holes 28B and 38B are formed in the $SiN_x$ film 45 by using the dry-etching method. By the above processes, the contact holes 28A and 28B are connected to each other and, as a result, a contact hole 28 is newly formed.

Figure 19:
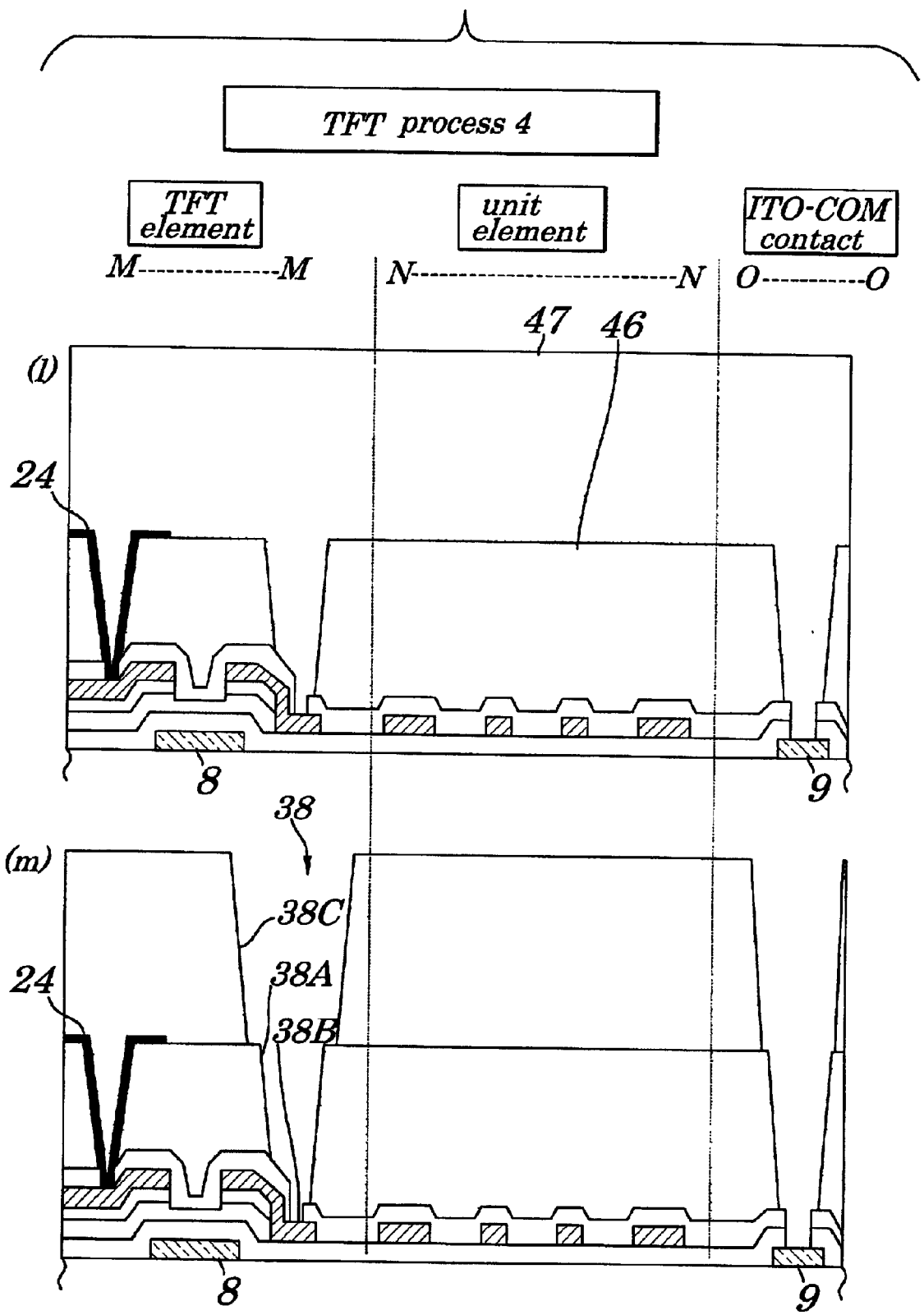
FIG. 19 is a process diagram illustrating the method of manufacturing the LCD in order of processes according to the third embodiment of the present invention.

Next, as shown in FIG. 18 (k), after an Mo film has been formed by the sputtering method on all surfaces of the contact hole, patterning is performed on the Mo film to form a second data line 24 having a desired shape by using the wet-etching method to be connected to a drain electrode 18 of the second TFT 30. Next, as shown in FIG. 19 (l), after a photosensitive organic insulating film 47 serving as a third interlayer insulating film 42 has been formed on all the above exposed components, by using the spin coating method, as shown in FIG. 19 (m), a contact hole 38C is formed by performing exposure and development processing on the photosensitive organic insulating film 47. By the above processes, the contact holes 38A, 38B, and 38C are connected to one another and, as a result, a contact hole 38 is newly formed. Moreover, the photosensitive organic insulating film 46 serves as the second interlayer insulating film 26 and the photosensitive organic insulating film 47 serves as the third interlayer insulating film 42.

Figure 20:
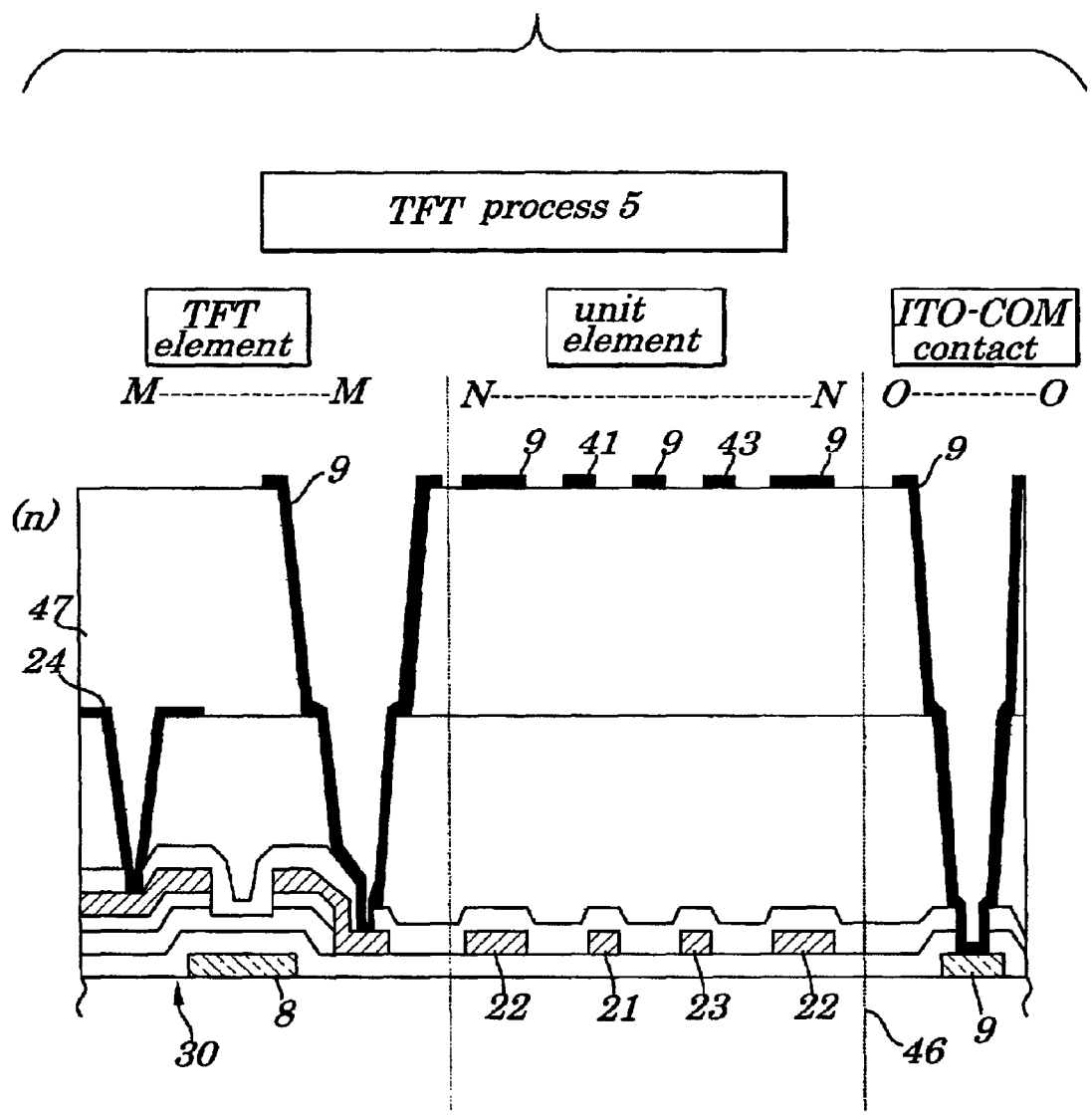
FIG. 20 is a process diagram illustrating the method of manufacturing the LCD in order of processes according to the third embodiment of the present invention.

Next, as shown in FIG. 20 (n), after an ITO film has been formed on all surfaces of the components being exposed by the sputtering method, patterning is performed on the ITO film to form first and second pixel electrodes 41 and 43 and common electrodes 9 each having a desired shape. Thus, by the above processes, main components of the LCD of the embodiment are now formed.

According to the method for manufacturing the LCD described above, by combining known processes of forming thin films including conductive films and insulating films and with known thin film patterning processes, the LCD can be easily manufactured without causing an increase in costs.

As shown in FIGS. 21 and 22, a scanning line driving circuit 51 is connected to the scanning line 8 making up one of the unit pixels being arranged in a matrix form and a scanning line signal is input to the unit pixel through the scanning line 8. A data line driving circuit 52 is connected to the first and second data lines 22 and 24 and a data line signal having a different polarity is fed each of the first and second data lines 22, 24. A common electrode wiring driving circuit 53 is connected to a common electrode wiring 4 and a common voltage is fed to the unit pixel through the common electrode wiring 4.

As is apparent from FIG. 22, in the terminal section A, first and second data line terminal sections 22A and 24A for one unit pixel are connected to another data line terminal sections 22A and 24A for another adjacent pixel (on right side in FIG. 22). In both the one unit pixel and the another adjacent pixel each of the data line terminal sections 22A and 24A corresponds to each of the first data line 22 and second data line 24. The first data line terminal section 22A has a drain wiring terminal 22a coated with an ITO film and a first data line terminal 22b having a contact hole while the second data line terminal section 24A has a drain wiring terminal 24a coated with the ITO film and a second data line terminal section 24b having a contact hole.

Moreover, as is apparent from FIG. 22, the terminal section B is made up of two pairs of a scanning terminal section 8A for the scanning line 8 and a common electrode wiring terminal section 4A for the common electrode wiring 4, both pairs being connected to each other. The scanning terminal section 8A is provided with a scanning line terminal section 8a being coated with an ITO film and with a scanning line terminal section 8a having a contact hole section. The common electrode wiring terminal section 4A is provided with a common electrode wiring terminal section 4a being coated with the ITO film and with a common electrode wiring terminal section 4b having a contact hole section.

Next, a method for manufacturing the LCD of the embodiment in the case where the second interlayer insulating film 26 is constructed of a stacked layer made up of an inorganic film and organic film will be described by referring to FIGS. 23 to 25. In FIGS. 23 to 25, portions indicated by symbols M—M, N—N, and O—O correspond respectively to cross-sectional views of FIG. 22 taken along each of the lines M—M, N—N, and O—O.

First, as shown in FIG. 23(a), after a Cr film has been formed by a sputtering method all over surfaces of a first transparent substrate 6 made of glass or a like, patterning is performed on the Cr film to form a scanning line terminal 8A and a common electrode terminal section 4A each having a desired shape, using a wet etching process.

Next, as shown in FIG. 23(b), a first interlayer insulating film 10 constructed of a stacked layer serving as a gate insulating film made up of an $SiO_x$ film and $SiN_x$ film is formed, by the CVD method, on all surfaces of the exposed layers. Then, as shown in FIG. 23(c), an a-Si film 12 and $n^+$-type a-Si film 15 are sequentially formed, by the plasma-CVD method, on all surfaces of the exposed components.

Next, as shown in FIG. 23 (d), after both the a-Si film 12 and the $n^+$-type a-Si film 15 have been removed by the dry-etching method, patterning is performed on the Cr layer to form a first data line 22 having a desired shape, using the dry-etching method. Next, as shown in FIG. 23 (e), by using the CVD method, an $SiN_x$ film 45 serving as a passivation film is formed on all surfaces of the exposed components.

Then, as showing by using the spin-coating method, a photosensitive organic insulating film 46 serving as a second interlayer insulating film 26 is formed on all surfaces of the exposed layers. Next, as shown in FIG. 24 (g), by performing exposure and development on the photosensitive organic insulating film 46, contact holes 55A, 56A, and 57A are formed. Then, as shown in FIG. 24 (h), by using the dry-etching method, contact holes 55B, 56B, and 57B are formed in the $SiN_x$ film 45.

Next, as shown in FIG. 25 (i), after a Mo film has been formed by the sputtering method on all surfaces of the exposed layers, patterning is performed on the Mo film using a wet-etching method to form a second data line 24 to be connected to a drain electrode 18 of the second TFT 30. Then, as shown in FIG. 25 (j), after a photosensitive organic insulating film 47 serving as a third interlayer insulating film 42 has been formed all surface of the exposed layers, by the spin coating method, as shown in FIG. 25 (k), exposure and development processing is performed on the photosensitive organic insulating film 47 to form contact holes 55C, 56C, and 57C. By the above processes, contact holes 55A to 55C, 56A to 56C, and 57A to 57C are connected to one another and, as a result, contact holes 55, 56, and 57 are formed.

Next, as shown in FIG. 25 (l), after an ITO film has been formed by the sputtering method on all surfaces of the exposed layers, patterning is performed on the ITO film using the wet-etching method to form a scanning line terminal 8a, a common electrode wiring terminal section 4A, a first data line terminal section 22a, and a second data line terminal section 24a, all of which are coated with the ITO films. By the above processes, the terminal section A and terminal section B of the LCD of the embodiment are formed.

Thus, approximately the same effects obtained in the first embodiment can be achieved in the third embodiment.

In addition, according to the third embodiment, since the first and second pixel electrodes 21, 23 and the common electrodes 9 are formed in the vicinity of the liquid crystal 3, the transverse electric field can be applied easily to the liquid crystal 3 and a driving voltage can be lowered accordingly. Moreover, since a leakage electric field from the data lines 22, 24 can be shielded with the common electrodes 9 formed in the uppermost layer, an area of the black matrix layer 34 can be reduced, which can further more improve the aperture rate. Furthermore, the LCD can be manufactured easily without causing an increase in costs.

Fourth Embodiment

Figure 26:
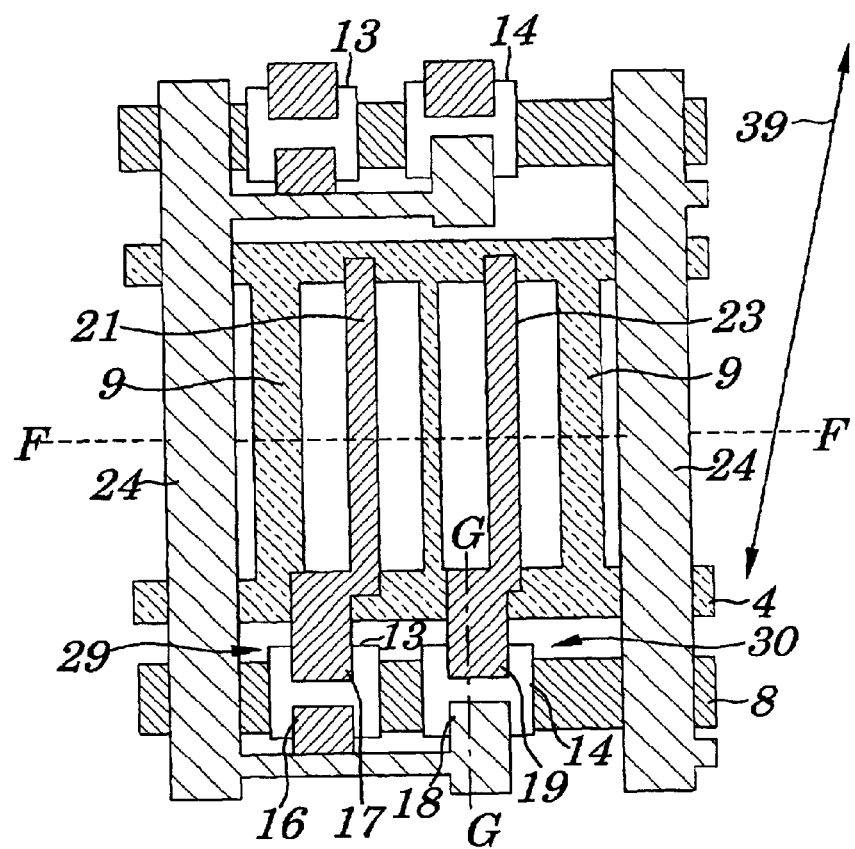
FIG. 26 is a plan view showing configurations of an LCD according to a fourth embodiment of the present invention.
Figure 27:
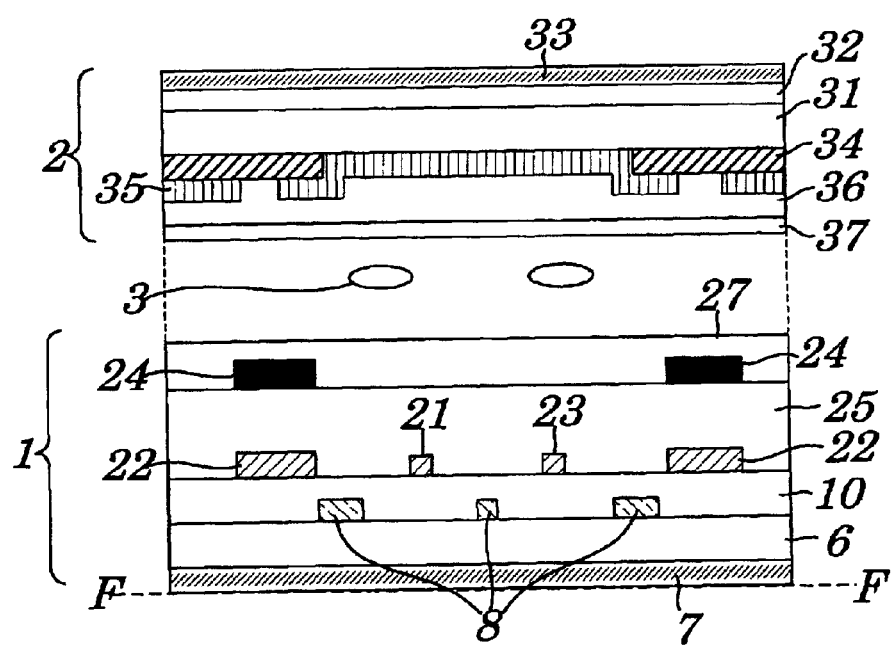
FIG. 27 is a cross-sectional view of FIG. 26 taken along a line F—F.
Figure 28:
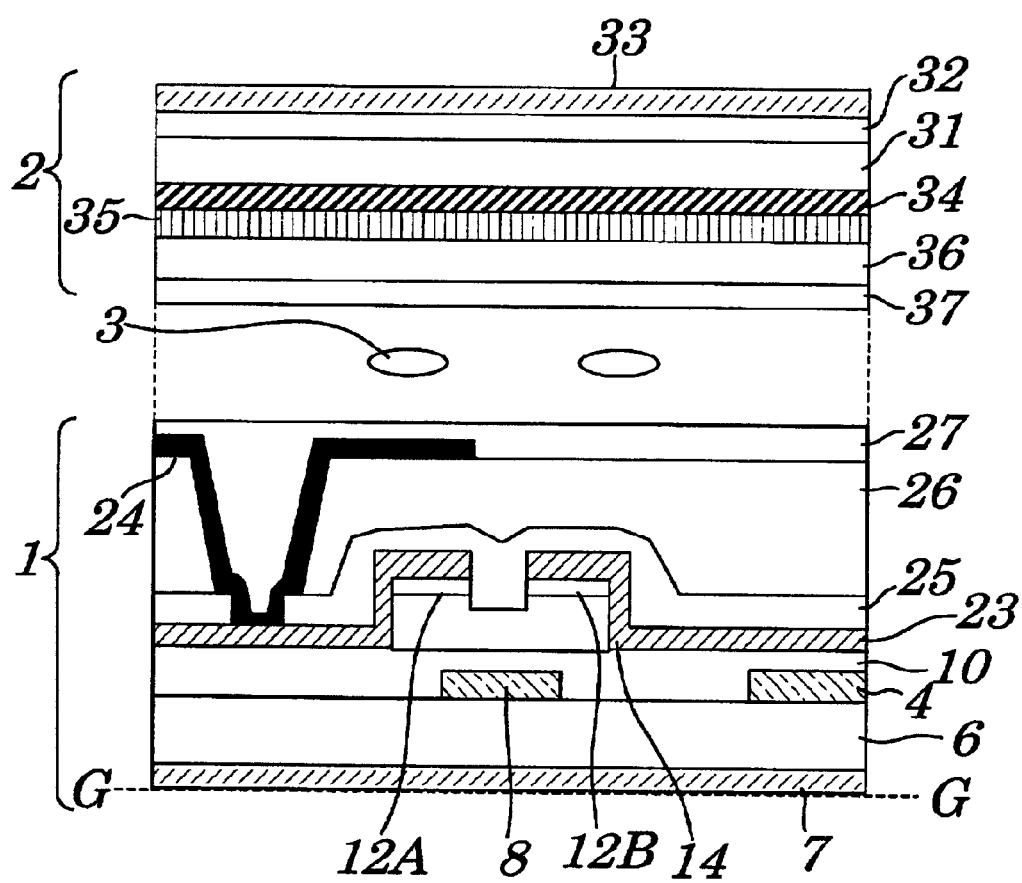
FIG. 28 is a cross-sectional view of FIG. 26 taken along a line G—G.

FIG. 26 is a plan view showing configurations of an LCD according to a fourth embodiment of the present invention. FIG. 27 is a cross-sectional view of FIG. 26 taken along a line F—F. FIG. 28 is a cross-sectional view of FIG. 26 taken along a line G—G. Configurations of the LCD of the fourth embodiment differ greatly from those in the first embodiment in that a passivation film is formed in a manner so as to cover two pixel electrodes. That is, in the LCD of the fourth embodiment, as shown in FIG. 27, surfaces of not only first data lines 22 but also first and second pixel electrodes 21 and 23 are covered by passivation film 25.

According to the fourth embodiment, since the first and second pixel electrodes 21 and 23 are covered by the passivation film 25 having a large thickness, they are little affected by a liquid crystal 3. Therefore, metal materials for the first and second pixel electrodes 21 and 23 are not limited to metals being stable for the liquid crystal 3 such as Al, Mo, Ti, or a like and such the metal being to be easily affected by the liquid crystal 3 as Cr or a like can be used. As a result, a range of choices for metals that can be used as the pixel electrodes 21, 23 can be extended.

Thus, approximately the same effects obtained in the first embodiment can be achieved in the fourth embodiment. In addition, as described above, metals for the pixel electrodes 21, 23 can be selected from a wide range of metals.

Fifth Embodiment

Figure 29:
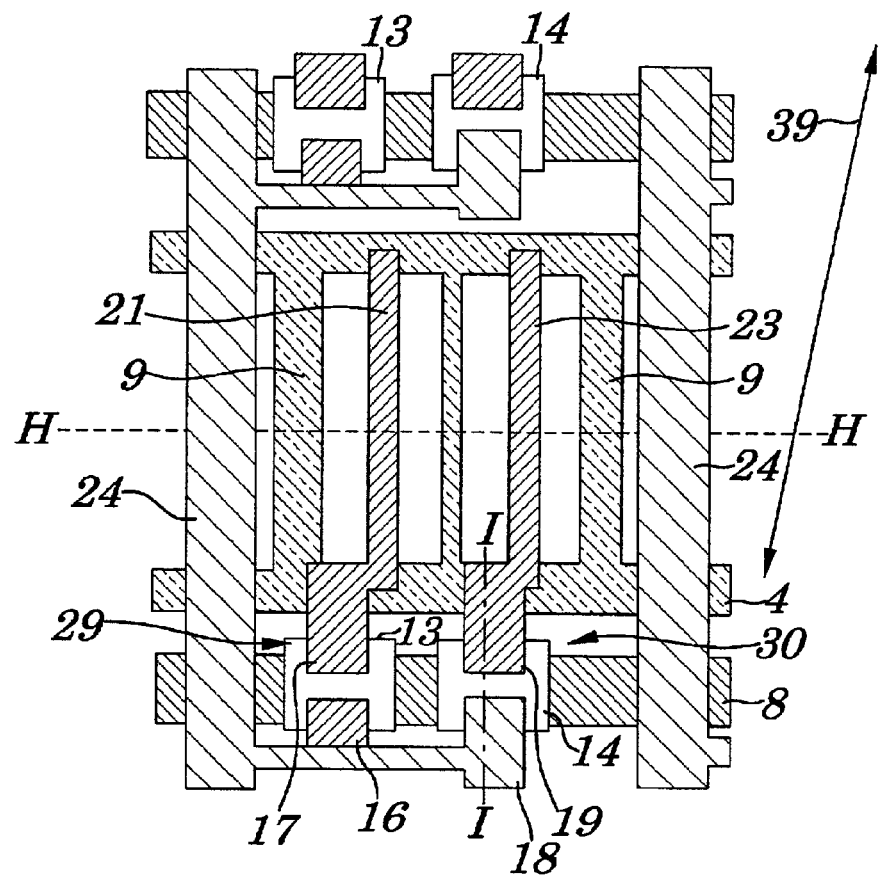
FIG. 29 is a plan view showing configurations of an LCD according to a fifth embodiment of the present invention.
Figure 30:
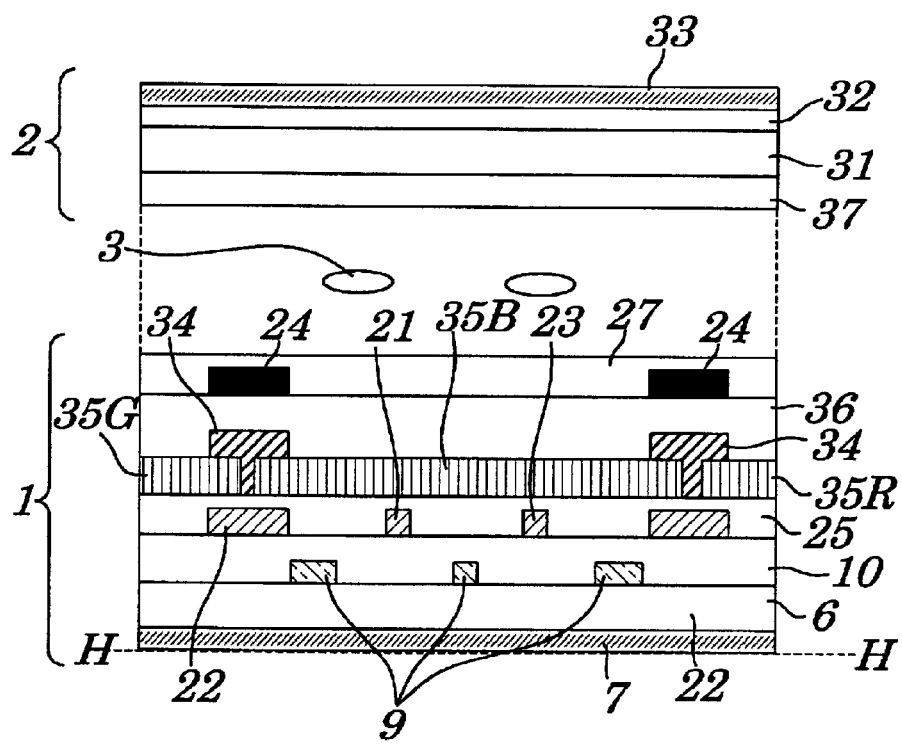
FIG. 30 is a cross-sectional view of FIG. 29 taken along a line H—H.
Figure 31:
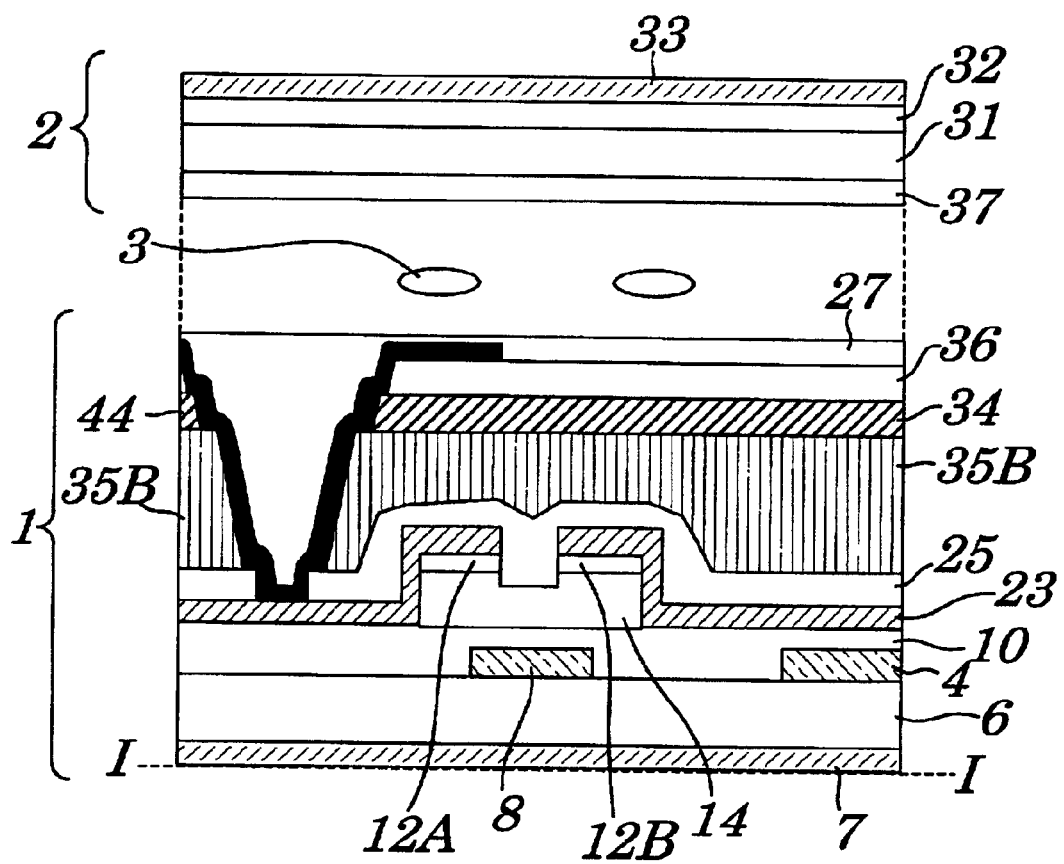
FIG. 31 is a cross-sectional view of FIG. 29 taken along a line I—I.

FIG. 29 is a plan view showing configurations of an LCD according to a fifth embodiment of the present invention. FIG. 30 is a cross-sectional view of FIG. 29 taken along a line H—H. FIG. 31 is a cross-sectional view of FIG. 29 taken along a line I—I. Configurations of the fifth embodiment differ greatly from those in the first embodiment in that a colored layer is formed in a TFT substrate. That is, in the LCD of the fifth embodiment, a blue colored layer 35B is formed approximately at a center of a passivation film 25 covering first and second pixel electrodes 21 and 23 and a first data line 22 on the TFT substrate 1. On one side of the blue colored layer 35B is formed a green colored layer 35G and on another side of the blue colored layer 35B is formed a red colored layer 35R. In a boundary portion among colored layers is formed a black matrix layer 34. A planarized film 36 is formed in a manner so as to cover the black matrix layer 34, the green colored layer 35G, the blue colored layer 35B, and the red colored layer 35R. On the planarized film 36 is formed a second data line 24 in such a manner that the first data line 22 is overlaid by the second data line 24 with the planarized film 36, the black matrix layer 34, the colored layer 35B, 35G, or 35R and the passivation film 25 being interposed between the first data line 22 and the second data line 24.

According to the embodiment, on the TFT substrate 1 are formed the first data line 22, the passivation film 25, the colored layer 35B, 35G, or 35R, the black matrix layer 34, the planarized film 36, and the second data line 24 and, therefore, unlike in the case in which the colored layer and black matrix layer are formed on a facing substrate 2, when the liquid crystal 3 is put in a hermetically sealed manner between the TFT substrate 1 and the facing substrate 2, it is not necessary to take into consideration a positional deviation between the TFT substrate 1 and the facing substrate 2 and, as a result, not necessary to set a margin for overlying, thus enabling further aperture rate to be improved.

Thus, approximately the same effects obtained in the first embodiment can be achieved in the fifth embodiment. In addition, further improvement of the aperture rate is made possible.

Sixth Embodiment

Figure 32:
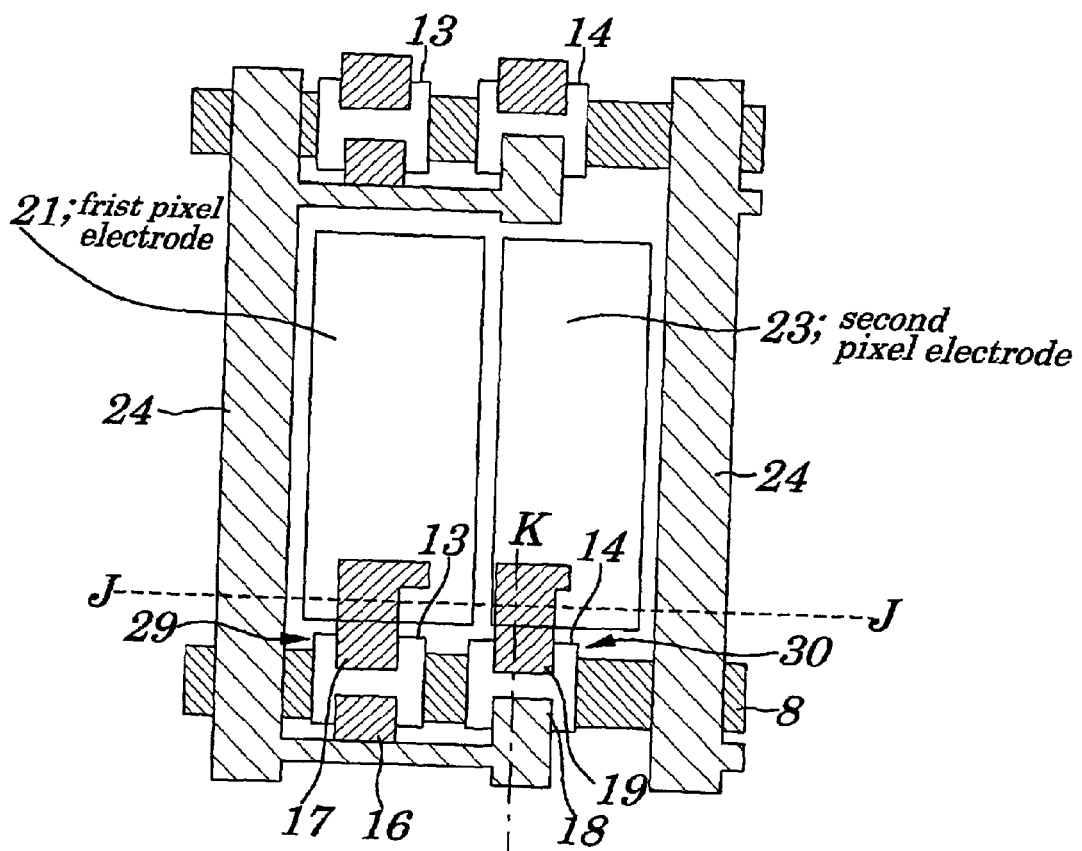
FIG. 32 is a plan view showing configurations of an LCD according to a sixth embodiment of the present invention.
Figure 33:
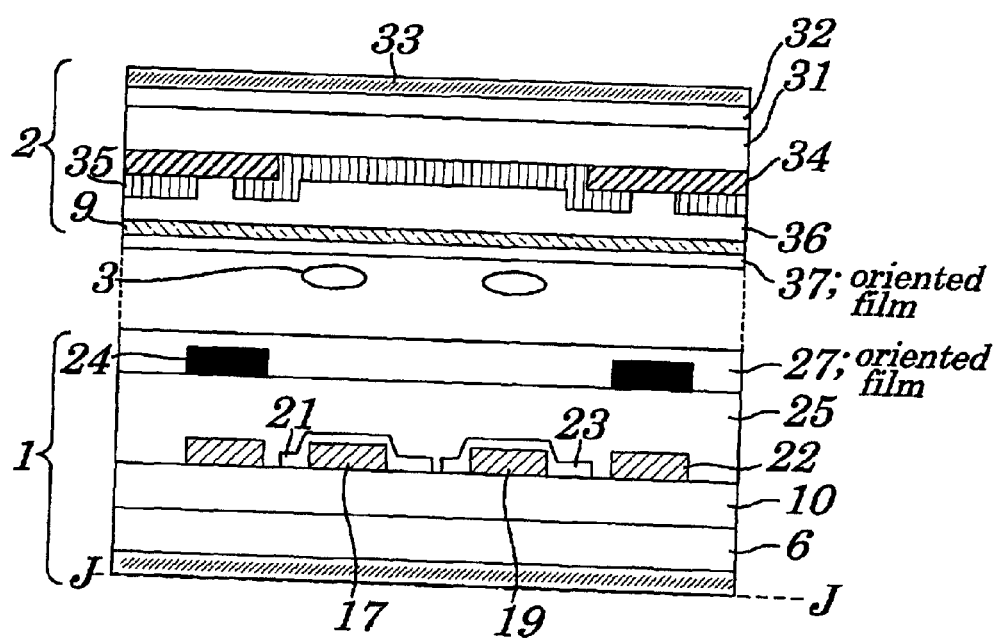
FIG. 33 is a cross-sectional view of FIG. 32 taken along a line J—J.
Figure 34:
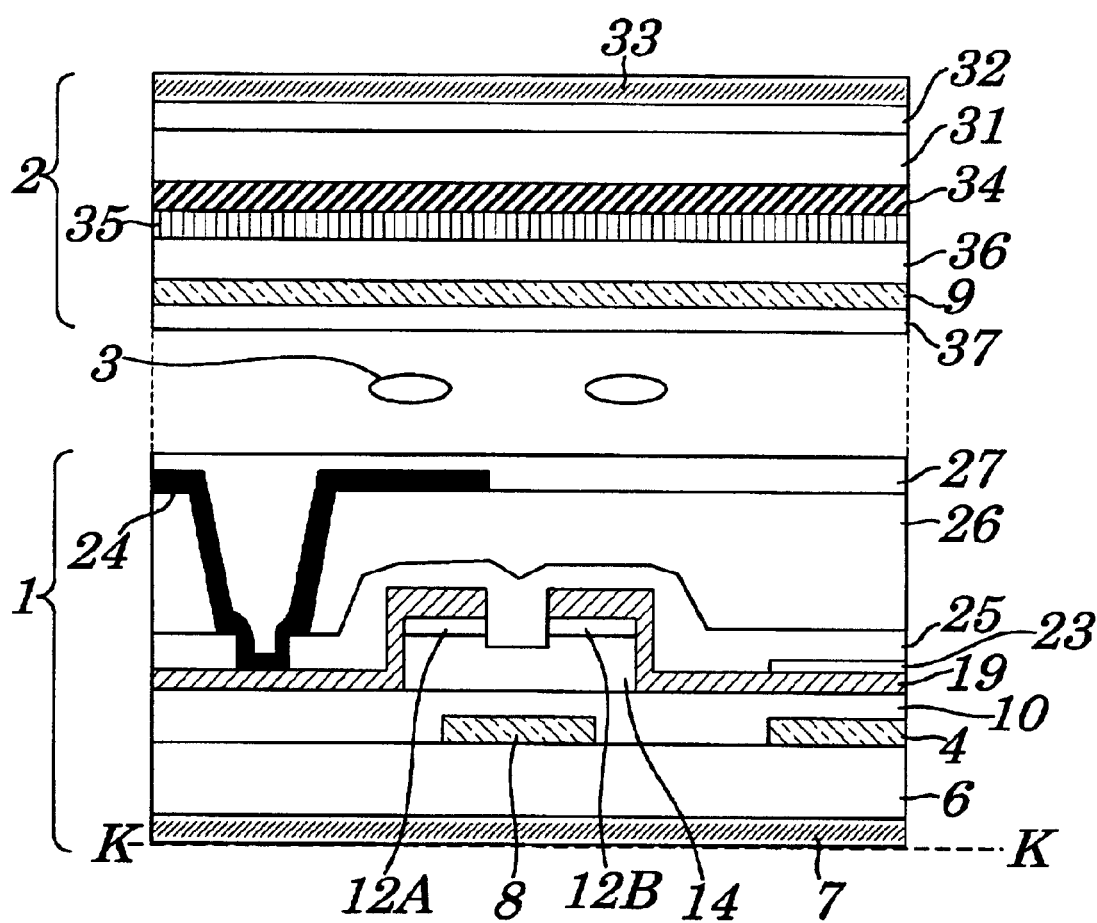
FIG. 34 is a cross-sectional view of FIG. 32 taken along a line K—K.
Figure 35:
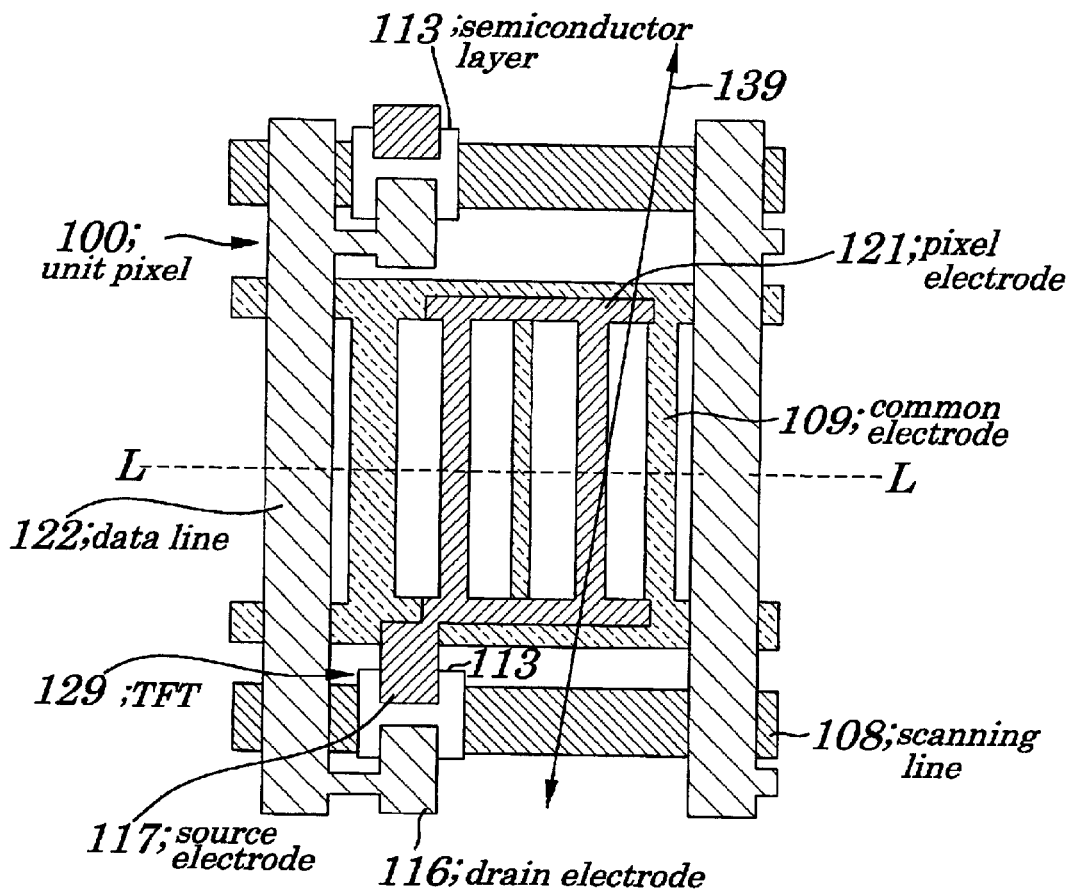
FIG. 35 is a plan view showing configurations of a conventional IPS-type LCD.
Figure 36:
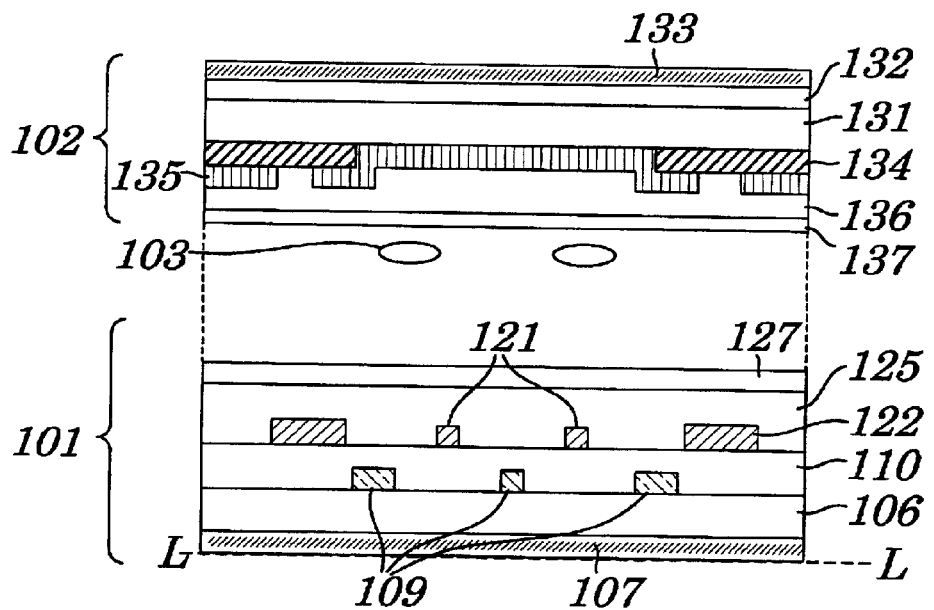
FIG. 36 is a cross-sectional view of FIG. 35 taken along a line L—L.
Figure 37:
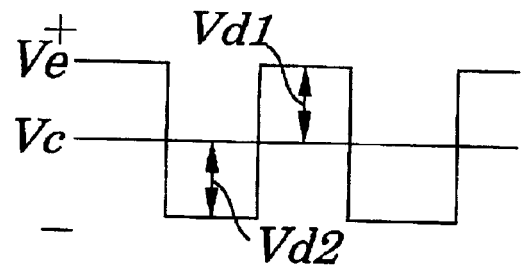
FIG. 37 is a diagram showing a waveform of a signal used in driving the conventional LCD of FIGS. 35 and 36.
Figure 38A:
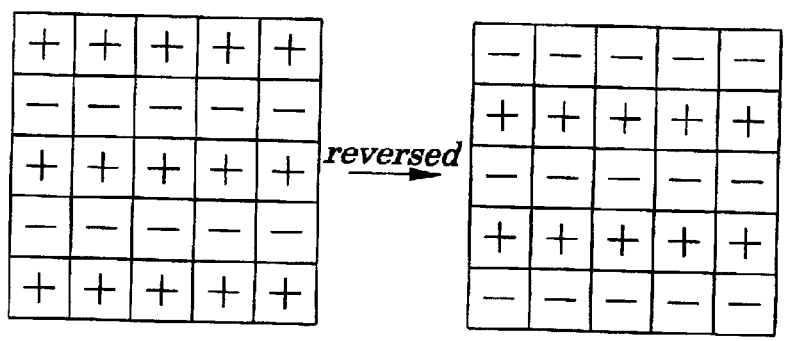
FIGS. 38A, 38B, and 38C are diagrams explaining methods for driving the conventional LCD.
Figure 38B:
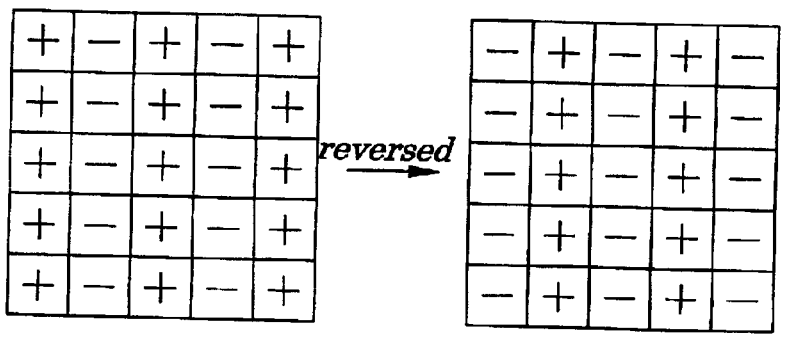
Figure 38C:
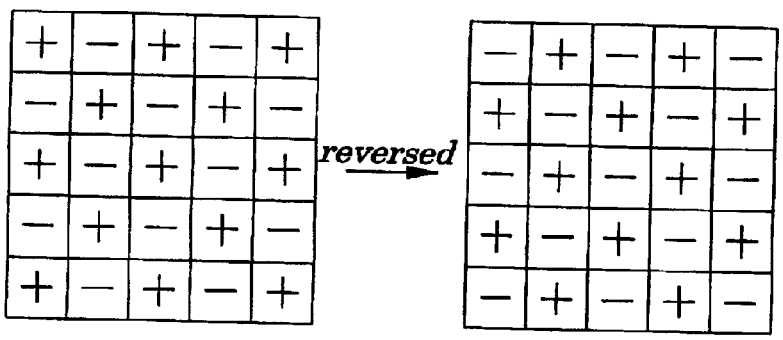
Figure 39:
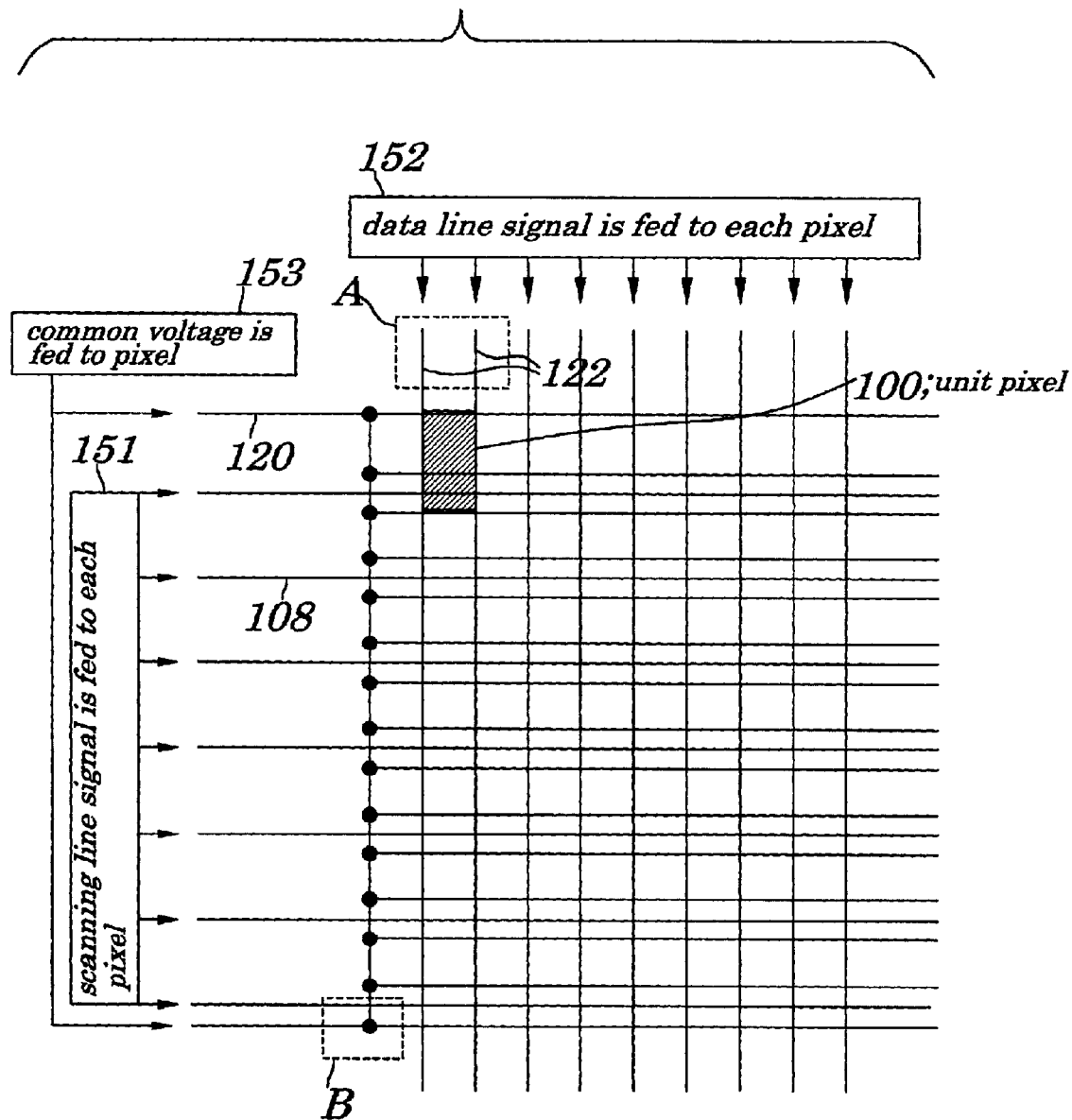
FIG. 39 is a diagram showing a driving circuit in the conventional LCD.
Figure 40:
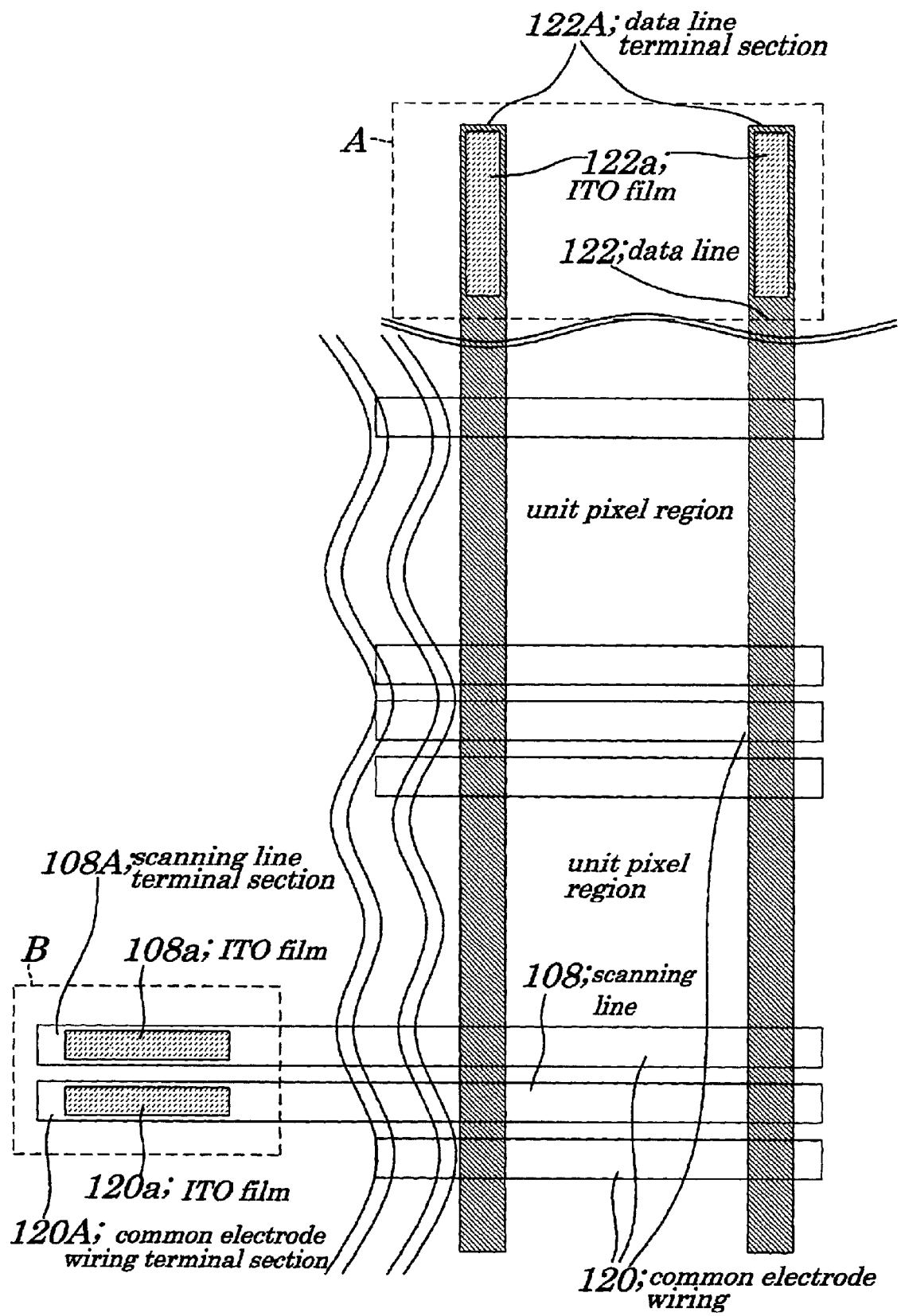
FIG. 40 is an expanded diagram showing a terminal section A shown in FIG. 39 and a terminal section B shown in FIG. 39.
Figure 41A:
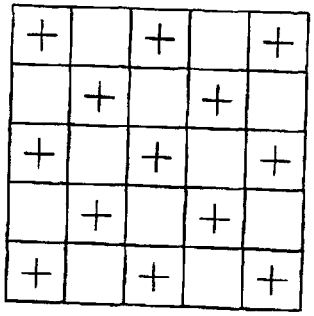
FIGS. 41A and 41B are diagrams explaining a disadvantage in the conventional LCD.
Figure 41B:
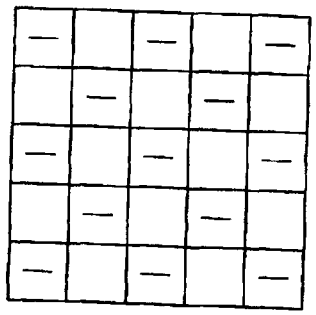
Figure 42B:
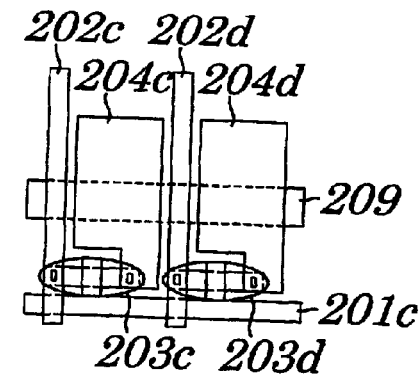
FIGS. 42A and 42B are diagrams showing configurations of a conventional LCD.
Figure 42A:
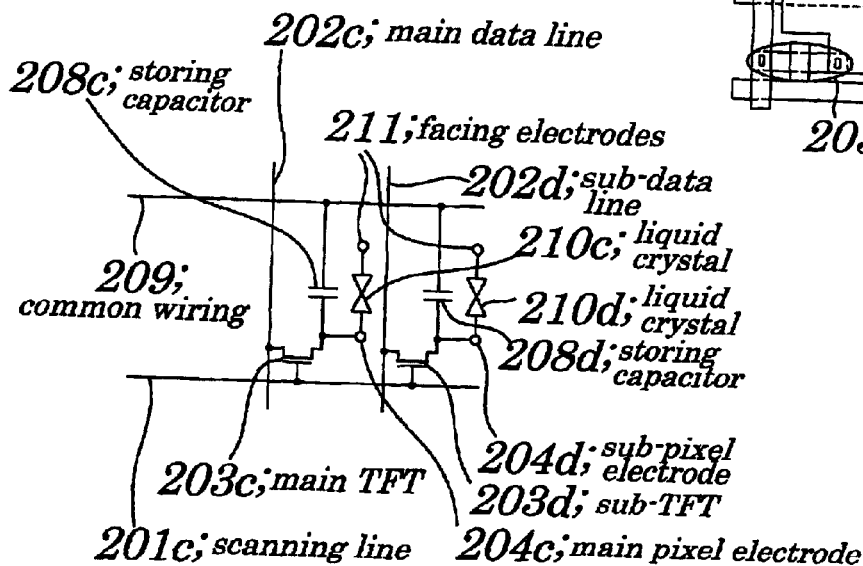

FIG. 32 is a plan view showing configurations of an LCD according to a sixth embodiment of the present invention. FIG. 33 is a cross-sectional view of FIG. 32 taken along a line J—J. FIG. 34 is a cross-sectional view of FIG. 32 taken along a line K—K. Configurations of the LCD of the sixth embodiment differ greatly from those in the first embodiment in that the present invention is applied to a TN-type LCD. That is, in the LCD of the sixth embodiment, as shown in FIGS. 32 to 34, a first data line 22 formed on a first interlayer insulating film 10 on a TFT substrate 1 is connected through a first TFT 29 to a first pixel electrode 21, while a second data line 24 is formed in such a manner that the first data line 22 is overlaid by the second data line 24 with a passivation film 25 being interposed between the first data line 22 and the second data line 24 is connected to a second pixel electrode 23. Moreover, a first oriented film 27 is formed in a manner so as to cover the second data line 24.

On the other hand, on a planarized film 36 on a facing substrate 2 is formed a common electrode 9 made of ITO and a second oriented film 37 is formed in a manner so as to cover the common electrode 9.

Except the above points, configurations of the LCD in the sixth embodiment are the same as those in the first embodiment. Therefore, in FIGS. 32 to 34, same reference numbers are assigned to corresponding parts having the same functions as those in FIGS. 1 to 4 and their descriptions are omitted accordingly.

According to the LCD of the sixth embodiment, since the present invention is applied to the TN-type LCD having an aperture rate being better than that of the IPS-type LCD and the first data line 22 is overlaid by the second data line 24 with the passivation film 25 being interposed between the first and second data lines 22 and 24 on the TFT substrate 1, the aperture rate can be more improved.

Thus, approximately the same effects obtained in the first embodiment can be achieved in the sixth embodiment. In addition, as described above, since the present invention is applied to the TN-type LCD in the sixth embodiment, more improvement of the aperture rate is made possible.

It is apparent that the present invention is not limited to the above embodiments but may be changed and modified without departing from the scope and spirit of the invention. For example, in the above embodiments, the TFT is used as the driving element to select a unit pixel to be displayed, however, the driving element is not limited to the TFT and two-terminal type elements such as an MIM (Metal Insulator Metal)-type element, diode-type element, varistor-type element, or a like may be employed. Moreover, in the above embodiments, the transparent substrate made of glass or a like is used as the driving element substrate, however, an opaque substrate such as polycrystalline silicon or a like may be used. In this case, the LCD operates as a reflective-type one and the pixel electrode operates as an reflective electrode also serving as a reflection plate. The materials for the insulating film or their thickness are one of examples and any material or thickness may be applied so long as they can achieve an object of the present invention and can meet conditions.

What is claimed is:

1. A liquid crystal display comprising:
a plurality of unit pixels each having a liquid crystal being put in a hermetically sealed manner between a driving element substrate on which a plurality of driving regions are formed and a facing substrate wherein a plurality of regions elements are made up of a plurality of first and second driving elements driven by a same scanning line, and having first and second pixel electrodes to one of which a first pixel voltage is fed from one of first and second data lines through a respective one of said first and second driving elements, and in which a second pixel voltage being opposite in polarity to said first pixel voltage is fed from the other respective one of said first and second data lines through the other respective one of said first and second driving elements;
wherein said first and second data lines are formed in a manner that said second data line is disposed above said first data line and in a manner that said first data line is overlaid by said second data line with an insulating film being interposed between said first and second data lines on said driving element substrate.

2. The liquid crystal display according to claim 1, wherein said insulating film is constructed of an organic insulating film or an inorganic insulating film or a stacked layer made up of both said organic insulating film and said inorganic insulating film.

3. The liquid crystal display according to claim 1, further comprising common electrodes, wherein said first and second pixel electrodes and said common electrodes are formed on said driving element substrate in a manner that said first and second pixel electrodes and said common electrodes are insulated from each other by an interlayer insulating film.

4. The liquid crystal display according to claim 1, wherein said first and second pixel electrodes and said first data line are formed on a same insulating film.

5. The liquid crystal display according to claim 1, wherein said first and second pixel electrodes and said second data line are covered by an oriented film.

6. The liquid crystal display according to claim 1, wherein said first and second data lines both applying a pixel voltage having a same polarity are formed so as to overlap each other.

7. The liquid crystal display according to claim 6, wherein said first and second data lines feed said first and second pixel voltages to said first and second pixel electrodes in unit pixels being different from each other.

8. The liquid crystal display according to claim 1, wherein a colored layer is formed on said driving element substrate.

9. The liquid crystal display according to claim 5, further comprising common electrodes formed on said driving element substrate, wherein said common electrodes are in contact with said liquid crystal through said oriented film.

10. The liquid crystal display according to claim 9, wherein said second data line is formed in a manner that said second data line is disposed above said first data line and that said first data line is overlaid by said second data line with said interlayer insulating film being interposed between said second and first data lines.

11. The liquid crystal display according to claim 1, further comprising common electrodes, wherein said first and second pixel electrodes and said common electrodes are formed on said same interlayer insulating film covering said second data line.

12. The liquid crystal display according to claim 11, wherein said common electrodes are formed on said facing substrate.

13. The liquid crystal display according to claim 1, wherein said unit pixel is driven by a one-horizontal-reverse driving method, a one-vertical-reverse driving method, or a dot-reverse driving method.

14. A liquid crystal display comprising:
a plurality of unit pixels each having a liquid crystal being put in a hermetically sealed manner between a driving element substrate on which a plurality of driving regions are formed and a facing substrate wherein a plurality of regions elements are made up of a plurality of first and second driving elements driven by a same scanning line, and having first and second pixel electrodes, to which a first pixel voltage is fed to said first pixel electrode from a first data line through said first driving element, and in which a second pixel voltage being opposite in polarity to said first pixel voltage is fed to said second pixel electrode from a second data line through said second driving element;
wherein said first and second data lines are formed in a manner that said second data line is disposed above said first data line and in a manner that said first data line is overlaid by said second data line with an insulating film being interposed between said first and second data lines on said driving element substrate.

15. The liquid crystal display according to claim 1, wherein the first and second pixel electrodes are comprised of one of Al, Cr, Mo, and Ti.

* * * * *